United States Patent
Pulley

(10) Patent No.: US 12,472,158 B2
(45) Date of Patent: Nov. 18, 2025

(54) METHODS OF TREATING TRIGEMINAL NERVE PAIN

(71) Applicant: Vanderbilt University, Nashville, TN (US)

(72) Inventor: Jill M. Pulley, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 976 days.

(21) Appl. No.: 17/433,935

(22) PCT Filed: Feb. 27, 2020

(86) PCT No.: PCT/US2020/020236
§ 371 (c)(1),
(2) Date: Aug. 25, 2021

(87) PCT Pub. No.: WO2020/176807
PCT Pub. Date: Sep. 3, 2020

(65) Prior Publication Data
US 2022/0133656 A1 May 5, 2022

Related U.S. Application Data

(60) Provisional application No. 62/811,258, filed on Feb. 27, 2019.

(51) Int. Cl.
*A61K 31/165* (2006.01)
*A61K 31/167* (2006.01)

(52) U.S. Cl.
CPC .......... *A61K 31/165* (2013.01); *A61K 31/167* (2013.01)

(58) Field of Classification Search
None
See application file for complete search history.

(56) References Cited

U.S. PATENT DOCUMENTS

| | | | |
|---|---|---|---|
| 3,632,645 A | 1/1972 | Bream et al. | |
| 5,580,859 A | 12/1996 | Felgner et al. | |
| 5,605,911 A | 2/1997 | Olney et al. | |
| 5,679,647 A | 10/1997 | Carson et al. | |
| 5,703,055 A | 12/1997 | Felgner | |
| 5,942,241 A | 8/1999 | Chasin et al. | |
| 6,287,599 B1 | 9/2001 | Burnside et al. | |
| 6,451,335 B1 | 9/2002 | Goldenheim et al. | |
| 6,534,081 B2 | 3/2003 | Goldenheim et al. | |
| 6,716,867 B1 | 4/2004 | Aantaa et al. | |
| 6,811,794 B2 | 11/2004 | Burnside et al. | |
| 6,921,541 B2 | 7/2005 | Chasin et al. | |
| 7,223,846 B2 | 5/2007 | Vale, Jr. et al. | |
| 7,638,607 B2 | 12/2009 | Vale, Jr. et al. | |
| RE41,998 E | 12/2010 | Campbell | |
| 8,080,550 B2 | 12/2011 | Horn | |
| 8,242,158 B1 | 8/2012 | Roychowdhury et al. | |
| 8,318,813 B2 | 11/2012 | Sanfilippo | |
| 8,338,470 B1 | 12/2012 | Roychowdhury et al. | |
| 8,455,527 B1 | 6/2013 | Roychowdhury et al. | |
| 8,648,106 B2 | 2/2014 | Roychowdhury et al. | |
| 9,040,082 B2 | 5/2015 | Kaiser | |
| 9,320,712 B2 | 4/2016 | Roychowdhury et al. | |
| 9,603,843 B2 | 3/2017 | Lipov | |
| 2002/0039599 A1 | 4/2002 | Lin et al. | |
| 2002/0147232 A1 | 10/2002 | Sundgreen et al. | |
| 2003/0022926 A1 | 1/2003 | Lavand'Homme | |
| 2003/0181354 A1 | 9/2003 | Abdulrazik | |
| 2003/0181426 A1 | 9/2003 | Eisenach | |
| 2003/0185873 A1* | 10/2003 | Chasin .................. A61K 31/47 424/426 |
| 2005/0058734 A1 | 3/2005 | Burch et al. | |
| 2005/0059744 A1 | 3/2005 | Donello et al. | |
| 2005/0148673 A1 | 7/2005 | Harbut et al. | |
| 2005/0153885 A1 | 7/2005 | Yun et al. | |
| 2007/0010584 A1 | 1/2007 | Peroutka | |
| 2007/0087977 A1 | 4/2007 | Robbins | |
| 2007/0219185 A1 | 9/2007 | Kobayashi et al. | |
| 2008/0020076 A1 | 1/2008 | Jhamandas et al. | |
| 2008/0021074 A1 | 1/2008 | Cartt | |
| 2009/0076156 A1 | 3/2009 | Husain et al. | |
| 2010/0029661 A1 | 2/2010 | Horn | |
| 2010/0249065 A1 | 9/2010 | Cohen et al. | |
| 2011/0217373 A1 | 9/2011 | Vivek et al. | |

(Continued)

FOREIGN PATENT DOCUMENTS

| | | |
|---|---|---|
| EP | 0331374 A2 | 9/1989 |
| WO | 2001048246 A1 | 7/2001 |

(Continued)

OTHER PUBLICATIONS

Qureshi et al., Intra-arterial Modulation of the Trigeminal Nerve Ganglion in Patients with Refractory Trigeminal Neuralgia. J Neuroimaging. Jan. 2018;28(1):79-85 (Year: 2018).*
Oertel et al., Br J Pharmacol. Feb. 2013;168(3):534-53 (Year: 2013).*
Goodloe et al., Eur J Heart Fail. Sep. 2014;16(9):942-9 (Year: 2014).*
Abdelmageed et al., "Analgesic properties of a dexmedetomidine infusion after uvulopalatopharyngoplasty in patients with obstructive sleep apnea", Saudi J Anaesth., 2011, vol. 5, No. 2, p. 150.
Abd-Elsayed et al., "A Double-Blind Randomized Controlled Trial Comparing Epidural Clonidine vs Bupivacaine for Pain Control During and After Lower Abdominal Surgery", Ochsner J., 2015. vol. 15, No. 2, pp. 133-142.
Adzhubei et al., "Predicting functional effect of human missense mutations using PolyPhen-2", Curr Protoc Hum Genet., Chapter 7, Unit 7.20, 2013, 52 pages.

(Continued)

*Primary Examiner* — Jeffrey S Lundgren
*Assistant Examiner* — Anthony Joseph Seitz
(74) *Attorney, Agent, or Firm* — Michael Best & Friedrich LLP

(57) ABSTRACT

Provided are methods for treating trigeminal nerve pain in a subject in need thereof. The method may include administering to the subject by perineural injection of the trigeminal nerve a therapeutically effective amount of a composition comprising an alpha-2 adrenergic agonist, such as guanfacine. The composition may further comprise lidocaine.

18 Claims, No Drawings

(56) References Cited

U.S. PATENT DOCUMENTS

| | | |
|---|---|---|
| 2011/0313046 A1 | 12/2011 | Ermer |
| 2012/0328695 A1 | 12/2012 | Kaiser |
| 2013/0178465 A1 | 7/2013 | Henwood et al. |
| 2013/0310412 A1 | 11/2013 | Toledano |
| 2014/0066842 A1 | 3/2014 | Zhang et al. |
| 2014/0121193 A1 | 5/2014 | Katz et al. |
| 2014/0271923 A1 | 9/2014 | Reid |
| 2015/0098982 A1 | 4/2015 | Pongpeerapat et al. |
| 2015/0250761 A1 | 9/2015 | Kaiser |
| 2016/0346233 A1 | 12/2016 | Singh et al. |
| 2017/0281531 A1 | 10/2017 | Sawyer et al. |
| 2017/0368176 A1* | 12/2017 | Kohane .................. A61K 9/127 |
| 2018/0169081 A1 | 6/2018 | Carlsson et al. |
| 2018/0185375 A1 | 7/2018 | Detke et al. |
| 2019/0282583 A1 | 9/2019 | Detke et al. |
| 2022/0054455 A1* | 2/2022 | Hong ..................... A61K 47/02 |

FOREIGN PATENT DOCUMENTS

| | | |
|---|---|---|
| WO | 2001089473 A1 | 11/2001 |
| WO | 2008003093 A2 | 1/2008 |
| WO | 2009035473 A2 | 3/2009 |
| WO | 2009155139 A1 | 12/2009 |
| WO | WO2010132882 A2 | 11/2010 |
| WO | WO2011085162 A2 | 7/2011 |
| WO | WO2012118562 A1 | 9/2012 |
| WO | 2012178014 A1 | 12/2012 |
| WO | WO2013090278 A3 | 6/2013 |
| WO | 2013191724 A1 | 12/2013 |
| WO | 2014071194 A2 | 5/2014 |
| WO | 2014160077 A1 | 10/2014 |
| WO | 2016209929 A1 | 12/2016 |
| WO | WO2017182852 A1 | 10/2017 |
| WO | 2018112138 A1 | 6/2018 |
| WO | 2019136224 A1 | 7/2019 |
| WO | 2024249843 A2 | 12/2024 |

OTHER PUBLICATIONS

Altman et al., "Abnormal regulation of the sympathetic nervous system in alpha2A-adrenergic receptor knockout mice", Mol Pharmacol., vol. 56, No. 1, 1999, pp. 154-161.
An et al., "A new animal model of trigeminal neuralgia produced by administration of cobra venom to the infraorbital nerve in the rat", Anesth Analg., 2011, vol. 113, No. 3, pp. 652-656.
Anttila et al., "Bioavailability of dexmedetomidine after extravascular doses in healthy subjects", Br J Clin Pharmacol., 2003, vol. 56, No. 6, pp. 691-693.
Boyer et al., "A novel formulation of ketorolac tromethamine for intranasal administration: preclinical safety evaluation", Int J Toxicol, 2010, vol. 29, No. 5, pp. 467-478.
Burma et al., "Animal models of chronic pain: Advances and challenges for clinical translation", J Neurosci Res., 2017, vol. 95, pp. 1242-1256.
Burrill et al., "The Pain Threshold Raising Effects of Amphetamine", J Dent Res., 1944, vol. 23, No. 5, pp. 337-344.
Carchman et al., "The bioavailability and pharmacokinetics of guanfacine after oral and intravenous administration to healthy volunteers," J. Clin. Pharmacol., 1987, pp. 762-767.
Chen et al., "Insertion/insertion genotype of α(2B)-adrenergic receptor gene polymorphism is associated with silent myocardial ischemia in patients with type 2 diabetes mellitus", Clin Biochem., 2010, vol. 43, No. 15, pp. 1201-1204.
Chrysostomou et al., "Dexmedetomidine: Therapeutic Use for the Termination of Reentrant Supraventricular Tachycardia", Congenit Heart Dis., 2013, vol. 8, No. 1, pp. 48-56.
Ciaccheri et al., "A-V block by an overdose of Clonidine", Acta Cardiol., 1983, vol. 38, No. 3, pp. 233-236.
Connor et al., "An open-label study of guanfacine extended release for traumatic stress related symptoms in children and adolescents", J Child Adolesc Psychopharmacol., 2013, vol. 23, No. 4, pp. 244-251.

Coursin et al., "Dexmedetomidine", Curr Opin Crit Care, 2001, vol. 7, No. 4, pp. 221-226.
Cruz, "Guanfacine Extended-Release Tablets (Intuniv), a Nonstimulant Selective Alpha(2A)-Adrenergic Receptor Agonist For Attention-Deficit/Hyperactivity Disorder", P T Peer-Rev J Formul Manag., 2010, vol. 35, No. 8, pp. 448-451.
De Fusco et al., "The α2B-adrenergic receptor is mutant in cortical myoclonus and epilepsy", Ann Neurol., 2014, vol. 75, No. 1, pp. 77-87.
Devcic et al., "Oral dexmedetomidine preserves baroreceptor function and decreases anesthetic requirements of halothane-anesthetized dogs", Anesthesiology, 1994 vol. 81, No. 2, pp. 419-430.
Di Cesare Mannelli et al., "α2 Adrenoceptor: a Target for Neuropathic Pain Treatment", Mini Rev Med Chem., 2017, vol. 17, No. 2, pp. 95-107.
Donnelly et al., "DNA Vaccines", Ann. Rev. Immunol., 1997, vol. 15, pp. 617-648.
Dorn, "Adrenergic signaling polymorphisms and their impact on cardiovascular disease", Physiol Rev., 2010, vol. 90, No. 3, pp. 1013-1062.
Dunn et al., "Non-opioid analgesics: Novel approaches to perioperative analgesia for major spine surgery", Best Pract Res Clin Anaesthesiol., 2016, vol. 30, No. 1, pp. 79-89.
Farghaly et al., "Effect of dexmedetomidine and cold stress in a rat model of neuropathic pain: Role of interleukin-6 and tumor necrosis factor-α", Eur J Pharmacol., 2016, vol. 5, No. 776, pp. 139-145.
Farghaly et al., "The effects of dexmedetomidine alone and in combination with tramadol or amitriptyline in a neuropathic pain model", Pain Physician., 2014, vol. 7, No. 2, pp. 187-195.
Faritus et al., "Oral Dexmedetomidine Versus Midazolam as Anesthetic Premedication in Children Undergoing Congenital Heart Surgery", Anesthesiol Pain Med., 2015, vol. 5, No. 3, pp. e25032.
Fernández Rodríguez et al., "Familial classic trigeminal neuralgia", Neurol Barc Spain., 2019, vol. 34, No. 4, pp. 229-233.
Flicek et al., "Ensembl 2011", Nucleic Acids Res., vol. 39, 2011, pp. D800-806.
Gertler et al., "Dexmedetomidine: a novel sedative-analgesic agent", Proc Bayl Univ Med Cent., 2001, vol. 14, No. 1, pp. 13-21.
Giovannitti et al., "Alpha-2 adrenergic receptor agonists: a review of current clinical applications", Anesth Prog., 2015, vol. 62, No. 1, pp. 31-39.
Goswami et al., "Sublingual drug delivery", Crit Rev Ther Drug Carrier Syst., 2008, vol. 25, No. 55, pp. 449-484.
Grassin-Delyle et al., "Intranasal drug delivery: an efficient and non-invasive route for systemic administration: focus on opioids", Pharmacol Ther., 2012, vol. 134, No. 3, pp. 366-379.
Hanci et al., "Rectal dexmedetomidine in rats: evaluation of sedative and mucosal effects", Braz J Anesthesiol Engl Ed., 2015, vol. 65, No. 1, pp. 1-6.
Hein et al., "Two functionally distinct alpha2-adrenergic receptors regulate sympathetic neurotransmission", Nature, vol. 402, No. 6758, 1999, pp. 181-184.
Heinonen et al., "Identification of a three-amino acid deletion in the alpha2B-adrenergic receptor that is associated with reduced basal metabolic rate in obese subjects", J Clin Endocrinol Metab., 1999, vol. 84, No. 7, pp. 2429-2433.
Hilliard et al., "A case report of dexmedetomidine used to treat intractable pain and delirium in a tertiary palliative care unit", Palliat Med., 2015, vol. 29, No. 3, pp. 278-281.
Huang et al., "Dexmedetomidine reduces neuropathic pain in a rat model of skin/muscle incision and retraction", Asian J Surg., 2017, vol. 40, No. 1, pp. 35-40.
Moghaddam et al., "The Effect of Pre-Emptive Dexmedetomidine on the Incidence of Post-Thoracotomy Pain Syndrome in Patients Undergoing Coronary Artery Bypass Grafting", Anesthesiol Pain Med., 2016, vol. 6, No. 3, e36344.
Jannu et al., "A comparison of oral midazolam and oral dexmedetomidine as premedication in pediatric anesthesia", Saudi J Anaesth., 2016, vol. 10, No. 4, pp. 390-394.
Jewell-Motz et al., "An acidic motif within the third intracellular loop of the alpha2C2 adrenergic receptor is required for agonist-

(56) References Cited

OTHER PUBLICATIONS promoted phosphorylation and desensitization", Biochemistry, 1995, vol. 34, No. 37, pp. 11946-11953.
Karczewski et al., "The ExAC browser: displaying reference data information from over 60,000 exomes", Nucleic Acids Res., 2017, vol. 45, pp. D840-D845.
Kent et al., "The human genome browser at UCSC", Genome Res., vol. 12, No. 6, 2002, pp. 996-1006.
Kersten et al., "Dexmedetomidine alters the hemodynamic effects of desflurane and isoflurane in chronically instrumented dogs", Anesthesiology, 1993, vol. 79, No. 5, pp. 1022-1032.
Kibler et al., "Effect of Clonidine on Atrioventricular Conduction", JAMA, 1977, vol. 238, No. 18, pp. 1930-1932.
Kim et al., "The sedative effects of the intranasal administration of dexmedetomidine in children undergoing surgeries compared to other sedation methods: A systematic review and meta-analysis", J Clin Anesth., 2017, vol. 38, pp. 33-39.
Kimura et al., "Dexmedetomidine decreases hyperalgesia in neuropathic pain by increasing acetylcholine in the spinal cord", Neurosci Lett., 2012, vol. 529, No. 1, pp. 70-74.
Koutroumani et al., "The deletion variant of α2b-adrenergic receptor is associated with decreased risk in Alzheimer's disease and mild cognitive impairment", J Neurol Sci., 2013, vol. 328, No. 1-2, pp. 19-23.
Kumar et al., "Predicting the effects of coding non-synonymous variants on protein function using the SIFT algorithm", Nat Protoc., 2009, vol. 4, No. 7, pp. 1073-1081.
Kumari et al., "Comparison of Oral Clonidine, Oral Dexmedetomidine, and Oral Midazolam for Premedication in Pediatric Patients Undergoing Elective Surgery", Anesth Essays Res., 2017, vol. 11, No. 1, pp. 185-191.
Link et al., "Cardiovascular regulation in mice lacking alpha2-adrenergic receptor subtypes b and c", Science, vol. 273, vol. 5276, 1996, pp. 803-805.
Luhrs et al., "Function of brain α2B-adrenergic receptor characterized with subtype-selective α2B antagonist and KO mice", Neuroscience, vol. 339, 2016, pp. 608-621.
Lundblad et al., "Alpha-2 adrenoceptor agonists as adjuncts to peripheral nerve blocks in children: a meta-analysis", Paediatr Anaesth., 2016, vol. 26, No. 3, pp. 232-238.
Lynds et al., "Neuronal plasticity of trigeminal ganglia in mice following nerve injury", J Pain Res., 2017, vol. 10, pp. 349-357.
MacDonald et al., "Gene targeting—homing in on alpha 2-adrenoceptor-subtype function", Trends Pharmacol Sci., vol. 18, No. 6, 1997, pp. 211-219.
MacMillan et al., "Central hypotensive effects of the alpha2a-adrenergic receptor subtype", Science, vol. 273, No. 5276, 1996, pp. 801-803.
McDonagh et al., "From pharmacogenomic knowledge acquisition to clinical applications: the PharmGKB as a clinical pharmacogenomic biomarker resource", Biomark Med., 2011, vol. 5, No. 6, pp. 795-806.
Murai et al., "Spontaneous and evoked pain-associated behaviors in a rat model of neuropathic pain respond differently to drugs with different mechanisms of action", Pharmacol Biochem Behav., 2016, vol. 141, pp. 10-17.
Muszkat et al., "Desensitization of vascular response in vivo: Contribution of genetic variation in the alpha2B-adrenergic receptor subtype", J Hypertens., 2010, vol. 28, No. 2, pp. 278-284.
Muszkat et al., "Variation in the alpha2B-adrenergic receptor gene (ADRA2B) and its relationship to vascular response in vivo", Pharmacogenet Genomics, 2005, vol. 15, No. 6, pp. 407-414.
Mystakidou et al., "Fentanyl nasal spray for the treatment of cancer pain", Expert Opin Pharmacother., 2011, vol. 12, No. 10, pp. 1653-1659.
O'Neil et al., "Dexmedetomidine as adjuvant therapy for acute postoperative neuropathic pain crisis", J Palliat Med., 2014, vol. 17, No. 10, pp. 1164-1166.

Oh et al. "Association between common genetic variants of α2A-, α2B-, and α2C-adrenergic receptors and ischemic stroke", Clin Neurol Neurosurg., 2013, vol. 115, No. 1, pp. 26-31.
OMIM Entry, * 104260—ALPHA-2B-ADRENERGIC Receptor; ADRA2B, <https://www.omim.org/entry/104260>, accessed Mar. 2017, 3 pages.
Ouchi et al., "Dexmedetomidine Dose Dependently Enhances the Local Anesthetic Action of Lidocaine in Inferior Alveolar Nerve Block: A Randomized Double-Blind Study", Reg Anesth Pain Med., 2016, vol. 41, No. 3, pp. 348-355.
Papanas et al., "An insertion/deletion polymorphism in the alpha2B adrenoceptor gene is associated with peripheral neuropathy in patients with type 2 diabetes mellitus", Exp Clin Endocrinol Diabetes Off J Ger Soc Endocrinol Ger Diabetes Assoc., 2007, vol. 115, No. 5, pp. 327-330.
Papazoglou et al., "An insertion/deletion polymorphism in the alpha2B adrenoceptor gene is associated with age at onset of type 2 diabetes mellitus", Exp Clin Endocrinol Diabetes Off J Ger Soc Endocrinol Ger Diabetes Assoc., 2006, vol. 114, No. 8, pp. 424-427.
Parent et al., "Use of dexmedetomidine in sustained ventricular tachycardia", Anaesth Intensive Care, 2010, vol. 38, No. 4, pp. 781-782.
Patel et al., "Advances in oral transmucosal drug delivery", J Control Release Off J Control Release Soc., 2011, vol. 153, No. 2, pp. 106-116.
Philipp et al., "Physiological significance of alpha(2)-adrenergic receptor subtype diversity: one receptor is not enough", Am J Physiol Regul Integr Comp Physiol., vol. 283, No. 2, 2002, pp. R287-295.
Pires et al., "Intranasal drug delivery: how, why and what for?", J Pharm Pharm Sci Publ Can Soc Pharm Sci Soc Can Sci Pharm., 2009, vol. 12, No. 3, pp. 288-311.
Politi et al., "Recent advances in exploring the genetic susceptibility to diabetic neuropathy", Diabetes Res Clin Pract., 2016, vol. 120, pp. 198-208.
Posey et al., "Guanfacine and guanfacine extended release: treatment for ADHD and related disorders", CNS Drug Rev., 2007, vol. 13, No. 4, pp. 465-474.
Prabhu et al., "Comparison of oral dexmedetomidine versus oral midazolam as premedication to prevent emergence agitation after sevoflurane anaesthesia in paediatric patients", Indian J Anaesth., 2017, vol. 61, No. 2, pp. 131-136.
Proctor et al., "Oral dexmedetomidine attenuates hemodynamic responses during emergence from general anesthesia in chronically instrumented dogs", Anesthesiology, 1991, vol. 74, No. 1, pp. 108-114.
Proctor et al., "Premedication with oral dexmedetomidine alters hemodynamic actions of intravenous anesthetic agents in chronically instrumented dogs", Anesthesiology, vol. 77, No. 3, pp. 554-562.
Pruitt et al., "NCBI Reference Sequences: current status, policy and new initiatives", Nucleic Acids Res., vol. 37, 2009, pp. D32-36.
Quintana et al., "The promise and pitfalls of intranasally administering psychopharmacological agents for the treatment of psychiatric disorders", Mol Psychiatry, 2016, vol. 21, No. 1, pp. 29-38.
Reisfield et al., "Rational use of sublingual opioids in palliative medicine", J Palliat Med., 2007, vol. 10, No. 2, pp. 465-475.
Schmitt et al., "Antinociceptive effects of some α-sympathomimetic agents", Neuropharmacology, 1974, No. 13, No. 5, pp. 289-294.
Schubert et al., "Preliminary results of guanfacine treatment of acute opiate withdrawal", Am J Psychiatry, 1984, vol. 141, No. 10, pp. 1271-1273.
Shahid et al., "Topical gabapentin gel alleviates allodynia and hyperalgesia in the chronic sciatic nerve constriction injury neuropathic pain model", Eur J Pain Lond Engl., 2017, vol. 21, No. 4, pp. 668-680.
Siitonen et al., "Association between a deletion/insertion polymorphism in the alpha2B-adrenergic receptor gene and insulin secretion and Type 2 diabetes", The Finnish Diabetes Prevention Study. Diabetologia., 2004, vol. 47, No. 8, pp. 1416-1424.
Sivenius et al., "A deletion in the alpha2B-adrenergic receptor gene and autonomic nervous function in central obesity", Obes Res., 2003, vol. 11, No. 8, pp. 962-970.

(56) References Cited

OTHER PUBLICATIONS

Sivenius et al., "Effect of a three-amino acid deletion in the alpha2B-adrenergic receptor gene on long-term body weight change in Finnish non-diabetic and type 2 diabetic subjects", Int J Obes Relat Metab Disord J Int Assoc Study Obes., 2001, vol. 25, No. 11, pp. 1609-1614.
Smith et al., "A comparison of two epidural alpha 2-agonists, guanfacine and clonidine, in regard to duration of antinociception, and ventilatory and hemodynamic effects in goats", Anesth Analg., 1992, vol. 74, No. 5, pp. 712-718.
Striebel et al., "Intranasal fentanyl titration for postoperative pain management in an unselected population", Anaesthesia, 1993, vol. 48, No. 9, pp. 753-757.
Suzuki et al., "Alpha(2B)-adrenergic receptor deletion polymorphism associates with autonomic nervous system activity in young healthy Japanese", J Clin Endocrinol Metab., 2003, vol. 88, No. 3, pp. 1184-1187.
Takata et al., "Dexmedetomidine-induced atrioventricular block followed by cardiac arrest during atrial pacing: a case report and review of the literature", J Anesth., 2014, vol. 28, No. 1, pp. 116-120.
Tayebati et al., "Intranasal drug delivery to the central nervous system: present status and future outlook", Curr Pharm Des., 2013, vol. 19, No. 3, pp. 510-526.
Thorne et al., "Delivery of insulin-like growth factor-I to the rat brain and spinal cord along olfactory and trigeminal pathways following intranasal administration", Neuroscience, 2004, vol. 127, No. 2, pp. 481-496.
UniProt Consortium, "UniProt: a hub for protein information", Nucleic Acids Res., vol. 43, 2015 pp. D204-212.
Wishart et al., "DrugBank: a comprehensive resource for in silico drug discovery and exploration", Nucleic Acids Res., vol. 34, 2006, pp. D668-672.
Wu et al., "BioGPS and MyGene.info: organizing online, gene-centric information", Nucleic Acids Res., 2013, vol. 41, pp. D561-565.
Yaksh, "Pharmacology of spinal adrenergic systems which modulate spinal nociceptive processing", Pharmacol Biochem Behav., 1985, vol. 22, No. 5, pp. 845-858.
Yoo et al., "Increased bioavailability of clomipramine after sublingual administration in rats", J Pharm Sci., 1999, vol. 88, No. 11, pp. 1119-1121.
Zhang et al., "Oral mucosal drug delivery: clinical pharmacokinetics and therapeutic applications", Clin Pharmacokinet., 2002, vol. 41, No. 9, pp. 661-680.
Zhang et al., "Adjuvants to prolong the local anesthetic effects of coated microneedle products", Int J. Pharm, 2012, vol. 439, No. 1-2, pp. 187-192.
PatientsLikeMe, "Common symptoms reported by people with Trigeminal Neuralgia", <https://www.patientslikeme.com/conditions/360-trigeminal-neuralgia/how-it-affects-people>, accessed Apr. 2017, 7 pages.
ClinicalTrails.gov, "Placebo-Controlled Evaluation of Intranasal Dexmedetomidine for Postoperative Analgesia Following Bunionectomy Surgery", <https://clinicaltrials.gov/ct2/show/study/NCT02284243?term=recro&rank=5>, Nov. 2014, 8 pages.
International Search Report and Written Opinion for Application No. PCT/US20/20236 dated May 19, 2020 (15 pages).
International Preliminary Report on Patentability for Application No. PCT/US20/20236 dated Aug. 25, 2021 (6 pages).
Raj SR, et al. Propranolol Decreases Tachycardia and Improves Symptoms in the Postural Tachycardia Syndrome: Less Is More. Circulation. 2009; 120:725-734.
Raj SR, et al. Canadian Cardiovascular Society Position Statement on Postural Orthostatic Tachycardia Syndrome (POTS) and Related Disorders of Chronic Orthostatic Intolerance. Can J Cardiol. 2020;36:357-372.
Raj V, et al. Psychiatric profile and attention deficits in postural tachycardia syndrome. J Neurol Neurosurg Psychiatry. 2009;80:339-344.
Rampakakis E, et al. Real-life assessment of the validity of patient global impression of change in fibromyalgia. RMD Open. 2015;1:e000146.
Renner TJ, et al. No evidence for association between a functional promoter variant of the Norepinephrine Transporter gene SLC6A2 and ADHD in a family-based sample. ADHD Atten Deficit Hyperact Disord. Sep. 2011;3(3):285-289.
Renova Therapeutics enters into agreement to receive stresscopin investigational new drug file from Janssen [Internet]. Renova Therapeutics. Feb. 6, 2017. Available from: https://renovatherapeutics.com/renova-therapeutics-enters-agreement-receive-stresscopin-investigational-new-drug-file-janssen/ (2 pages).
Renova Therapeutics. U.S. patent for Urocortin 2 gene constructs issued [Internet]. Dated Feb. 21, 2017 . Available from: https://renovatherapeutics.com/u-s-patent-urocortin-2-gene-constructs-issued/ (2 pages).
Renova Therapeutics. Urocortin 2 gene transfer increases glucose disposal and insulin sensitivity in type 2 diabetes [Internet]. Dated Jul. 17, 2017. Available from: https://renovatherapeutics.com/urocortin-2-gene-transfer-increases-glucose-disposal-insulin-sensitivity-type-2-diabetes/ (2 pages).
Roerink ME, et al. Postural orthostatic tachycardia is not a useful diagnostic marker for chronic fatigue syndrome. J Intern Med. Feb. 2017;281(2):179-188.
Roncero C, et al. The use of lisdexamfetamine dimesylate for the treatment of ADHD and other psychiatric disorders. Expert Rev Neurother. Aug. 2014;14(8):849-865.
Ross AJ, et al. A double-blind placebo-controlled cross-over study of the vascular effects of midodrine in neuropathic compared with hyperadrenergic postural tachycardia syndrome. Clin Sci. 2014;126:289-296.
Rowe PC, et al. Is neurally mediated hypotension an unrecognised cause of chronic fatigue? Lancet Lond Engl. Mar. 11, 1995;345(8950):623-624.
Ruggiero S, et al. Guanfacine for attention deficit and hyperactivity disorder in pediatrics: A systematic review and meta-analysis. Eur Neuropsychopharmacol. Oct. 2014;24(10):1578-1590.
Runkel F, et al. Pharmacological properties of naturally occurring variants of the human norepinephrine transporter. Pharmacogenetics. Jul. 2000;10(5):397-405.
Schondorf R, et al. Orthostatic intolerance in the chronic fatigue syndrome. J Auton Nerv Syst. Feb. 15, 1999;75(2-3):192-201.
Schondorf R, et al. The importance of orthostatic intolerance in the chronic fatigue syndrome. Am J Med Sci. Feb. 1999;317(2):117-123.
Schondorf R, et al. Idiopathic postural orthostatic tachycardia syndrome: an attenuated form of acute pandysautonomia? Neurology. 1993;43:132-137.
Schrepf A, et al. Somatic Awareness and Tender Points in a Community Sample. J Pain Off J Am Pain Soc. Dec. 2016;17(12):1281-1290. PMCID: PMC5125857.
Shannon JR, et al. Orthostatic intolerance and tachycardia associated with norepinephrine-transporter deficiency. N Engl J Med. Feb. 24, 2000;342(8):541-549.
Sharma A, et al. A Review of the Pathophysiology, Etiology, and Treatment of Attention-Deficit Hyperactivity Disorder (ADHD). Ann Pharmacother. Feb. 1, 2014;48(2):209-225.
Sheldon RS, et al. 2015 Heart Rhythm Society Expert Consensus Statement on the Diagnosis and Treatment of Postural Tachycardia Syndrome, Inappropriate Sinus Tachycardia, and Vasovagal Syncope. Heart Rhythm. 2015;12:e41-e63.
Shibao C, et al. Hyperadrenergic postural tachycardia syndrome in mast cell activation disorders. Hypertension. 2005;45:385-390.
Shirey-Rice JK, et al. Norepinephrine transporter variant A457P knock-in mice display key features of human postural orthostatic tachycardia syndrome. Dis Model Mech. Jul. 2013;6(4):1001-1011. PMCID: PMC3701219.
Shores MM, et al. Desipramine-induced increase in norepinephrine transporter mRNA is not mediated via $\alpha 2$ receptors. Mol Brain Res. Dec. 1994;27(2):337-341.
Sletten DM, et al. COMPASS 31: A refined and abbreviated composite autonomic symptom score. Mayo Clinic Proceedings. 2012;87:1196-1201.

(56) References Cited

OTHER PUBLICATIONS

Soetekouw Pmmb, et al. Autonomic function in patients with chronic fatigue syndrome. Clin Auton Res. Dec. 1999;9(6):334-340.
Sorkin EM, et al. Guanfacine. A review of its pharmacodynamic and pharmacokinetic properties, and therapeutic efficacy in the treatment of hypertension. Drugs. 1986;31:301-336.
Srour H, et al. Enteral Guanfacine to Treat Severe Anxiety and Agitation Complicating Critical Care After Cardiac Surgery. Semin Cardiothorac Vasc Anesth. 2018;22:403-406.
Stewart JM, et al. Patterns of orthostatic intolerance: the orthostatic tachycardia syndrome and adolescent chronic fatigue. J Pediatr. Aug. 1999;135(2 Pt 1):218-225.
Stewart JM. Autonomic nervous system dysfunction in adolescents with postural orthostatic tachycardia syndrome and chronic fatigue syndrome is characterized by attenuated vagal baroreflex and potentiated sympathetic vasomotion. Pediatr Res. Aug. 2000;48(2):218-226.
Stickford ASL, et al. Menstrual cycle phase does not affect sympathetic neural activity in women with postural orthostatic tachycardia syndrome. J Physiol. 2015;593:2131-2143.
Stirrat CG, et al. Cardiovascular effects of urocortin 2 and urocortin 3 in patients with chronic heart failure: Cardiovascular effects of urocortin 2 and urocortin 3 in heart failure. Br J Clin Pharmacol. Oct. 2016;82(4):974-982.
Stober, G., et al. "Systematic search for variation in the human norepinephrine transporter gene: identification of five naturally occurring missense mutations and study of association with major psychiatric disorders." American journal of medical genetics 67.6 (1996): 523-532.
Strawn JR, et al. Extended Release Guanfacine in Pediatric Anxiety Disorders: A Pilot, Randomized, Placebo-Controlled Trial. J Child Adolesc Psychopharmacol. 2017;27:29-37.
Streeten DH, et al. The role of delayed orthostatic hypotension in the pathogenesis of chronic fatigue. Clin Auton Res Off J Clin Auton Res Soc. Apr. 1998;8(2):119-124.
Streeten DH, et al. The roles of orthostatic hypotension, orthostatic tachycardia, and subnormal erythrocyte volume in the pathogenesis of the chronic fatigue syndrome. Am J Med Sci. Jul. 2000;320(1):1-8.
Streeten DH. Role of impaired lower-limb venous innervation in the pathogenesis of the chronic fatigue syndrome. Am J Med Sci. Mar. 2001;321(3):163-167.
Sulheim, D,, et al. "Disease mechanisms and clonidine treatment in adolescent chronic fatigue syndrome: a combined cross-sectional and randomized clinical trial." JAMA pediatrics 168.4 (2014): 351-360.
Szabo B, et al. Effects of imidazoline antihypertensive drugs on sympathetic tone and noradrenaline release in the prefrontal cortex. Br J Pharmacol. Sep. 2001;134(2):295-304.
Tellioglu T, et al. Genetic or acquired deficits in the norepinephrine transporter: current understanding of clinical implications. Expert Rev Mol Med [Internet]. Nov. 2001 [cited Jul. 26, 2016];3(29). Available from: http://www.journals.cambridge.org/abstract_S1462399401003878.
Theoharides, T. C., et al. "Brain "fog," inflammation and obesity: key aspects of neuropsychiatric disorders improved by luteolin." Frontiers in neuroscience 9 (2015): 225.
Thieben MJ, et al. Postural orthostatic tachycardia syndrome: the Mayo clinic experience. Mayo Clin Proc. 2007;82:308-313.
Valikodath, N. G., et al. "Agreement of ocular symptom reporting between patient-reported outcomes and medical records." JAMA ophthalmology 135.3 (2017): 225-231.
Van Zwieten PA, et al. The hypotensive activity and side effects of methyldopa, clonidine, and guanfacine. Hypertension [Internet]. 1984 [cited Sep. 18, 2023];6. Available from: https://www.ahajournals.org/doi/10.1161/01.HYP.6.5_Pt_2.1128.
Vanicek T, et al. The Norepinephrine Transporter in Attention-Deficit/Hyperactivity Disorder Investigated With Positron Emission Tomography. JAMA Psychiatry. Dec. 1, 2014;71(12):1340.
Vernino S, et al. Randomized controlled trial of intravenous immunoglobulin for autoimmune postural orthostatic tachycardia syndrome (iSTAND). Clin Auton Res. 2024;34:153-163.
Wilkinson DJ, et al. Sympathetic activity in patients with panic disorder at rest, under laboratory mental stress, and during panic attacks. Arch Gen Psychiatry. 1998;55:511-520.
Wilson MF, et al. Comparison of guanfacine versus clonidine for efficacy, safety and occurrence of withdrawal syndrome in step-2 treatment of mild to moderate essential hypertension. Am J Cardiol. 1986;57:43E-49E.
Wyller VB, et al. Abnormal thermoregulatory responses in adolescents with chronic fatigue syndrome: relation to clinical symptoms. Pediatrics. Jul. 2007;120(1):e129-137.
Wyller VB, et al. Blood pressure variability and closed-loop baroreflex assessment in adolescent chronic fatigue syndrome during supine rest and orthostatic stress. Eur J Appl Physiol. Mar. 2011;111(3):497-507. PMCID: PMC3037975.
Higuchi M, et al. Evaluation of long-term treatment of essential hypertension with guanfacine. Br J Clin Pharmacol. 1980;10(Suppl 1):61S-64S.
Hinkle RT, et al. Urocortin II treatment reduces skeletal muscle mass and function loss during atrophy and increases nonatrophying skeletal muscle mass and function. Endocrinology. Nov. 2003;144(11):4939-4946.
Hoad A, et al. Postural orthostatic tachycardia syndrome is an under-recognized condition in chronic fatigue syndrome. QJM Mon J Assoc Physicians. Dec. 2008;101(12):961-965.
Honda T, et al. Augmented sympathoadrenal activity during treadmill exercise in patients with Wolff-Parkinson-White syndrome and atrial fibrillation. Jpn Circ J. Jan. 1996;60(1):43-49.
Hsu Sy, et al. Human stresscopin and stresscopin-related peptide are selective ligands for the type 2 corticotropin-releasing hormone receptor. Nat Med. May 2001;7(5):605-611.
Huang J, et al. Corticotropin releasing factor up-regulates the expression and function of norepinephrine transporter in SK-N-BE (2) M17 cells. J Neurochem. Oct. 2015;135(1):38-49.
International Search Report and Written Opinion for Application No. PCT/US2024/031978 dated Nov. 19, 2024 (12 pages).
Jacob G, et al. Diabetic autonomic neuropathy. Spectrum of disease and treatment. Clin Auton Res. 1996;296.
Jacob G, et al. The neuropathic postural tachycardia syndrome. N Engl J Med. 2000;343:1008-1014.
Jacob G, et al. Hypovolemia in Syncope and Orthostatic Intolerance Role of the Renin-Angiotensin System. The American Journal of Medicine. 1997;103:128-133.
Johns Hopkins Medicine. Pheochromocytoma: An Adrenal Gland Tumor | Johns Hopkins Medicine Health Library [Internet]. Version dated May 5, 2020. Available from: https://web.archive.org/web/20250000000000*/https://www.hopkinsmedicine.org/health/conditions-and-diseases/adrenal-tumors--pheochromocytoma (4 pages).
Jordan J, et al. Increased sympathetic activation in idiopathic orthostatic intolerance: role of systemic adrenoreceptor sensitivity. Hypertension. 2002;39:173-178.
Kanehisa M, et al. KEGG as a reference resource for gene and protein annotation. Nucleic Acids Res. Jan. 4, 2016;44(D1):D457-462. PMCID: PMC4702792.
Kanjwal K, et al. Clinical presentation and management of patients with hyperadrenergic postural orthostatic tachycardia syndrome. A single center experience. Cardiol J. 2011;19:527-531.
Kaufmann H, et al. The Orthostatic Hypotension Questionnaire (OHQ): validation of a novel symptom assessment scale. Clin Auton Res. 2012;22:79-90.
Keller NR. Norepinephrine Transporter-Deficient Mice Exhibit Excessive Tachycardia and Elevated Blood Pressure With Wakefulness and Activity. Circulation. Sep. 7, 2004;110(10):1191-1196.
Khan, A. W., et al. "Epigenomic changes associated with impaired norepinephrine transporter function in postural tachycardia syndrome." Neuroscience & Biobehavioral Reviews 74 (2017): 342-355.
Khan, A. W., et al. "NET silencing by let-7i in postural tachycardia syndrome." JCI insight 2.6 (2017).

(56) References Cited

OTHER PUBLICATIONS

Kim C-H, et al. A polymorphism in the norepinephrine transporter gene alters promoter activity and is associated with attention-deficit hyperactivity disorder. Proc Natl Acad Sci. Dec. 12, 2006;103(50):19164-19169.

Kinzie JD, et al. Clonidine in Cambodian Patients with Posttraumatic Stress Disorder: J Nerv Ment Dis. Sep. 1989;177(9):546-550.

Kohli U, et al. Genetic variation in the presynaptic norepinephrine transporter is associated with blood pressure responses to exercise in healthy humans: Pharmacogenet Genomics. Feb. 2011;1.

Kozicz T, et al. Chronic psychosocial stress affects corticotropin-releasing factor in the paraventricular nucleus and central extended amygdala as well as urocortin 1 in the non-preganglionic Edinger-Westphal nucleus of the tree shrew. Psychoneuroendocrinology. Jul. 2008;33(6):741-754.

Kuchel O. Pseudopheochromocytoma. Hypertension. 1985;7:151-158.

Lai NC, et al. Intravenous AAV8 Encoding Urocortin-2 Increases Function of the Failing Heart in Mice. Hum Gene Ther. Jun. 2015;26(6):347-356. PMCID: PMC4492611.

Lewis I, et al. Clinical characteristics of a novel subgroup of chronic fatigue syndrome patients with postural orthostatic tachycardia syndrome. J Intern Med. May 2013;273(5):501-510.

Liao Y, et al. Flow-mediated vasodilation and endothelium function in children with postural orthostatic tachycardia syndrome. Am J Cardiol. 2010;106:378-382.

Liu H, et al. Representativeness of the Patient-Reported Outcomes Measurement Information System Internet panel. Journal of Clinical Epidemiology. 2010;63:1169-1178.

Ludolph A, et al. Atomoxetine affects transcription/translation of the NMDA receptor and the norepinephrine transporter in the rat brain &ndash; an in vivo study. Drug Des Devel Ther. Dec. 2013;1433.

Mann SJ, et al. Clarifying the Cause and Treatment of Paroxysmal Hypertension (Pseudopheochromocytoma). Curr Hypertens Rep. 2022;24:353-359.

Mar PL, et al. Neurogenic hyperadrenergic orthostatic hypotension: a newly recognized variant of orthostatic hypotension in older adults with elevated norepinephrine (noradrenaline). Clin Sci (Lond). 2015;129:107-116.

Marques FZ, et al. A polymorphism in the norepinephrine transporter gene is associated with affective and cardiovascular disease through a microRNA mechanism. Mol Psychiatry. Jan. 2017;22(1):134-141.

Medina G, et al. Metformin increases norepinephrine transporter expression in placenta of patients with polycystic ovary syndrome. Eur Rev Med Pharmacol Sci. Aug. 2017;21(15):3482-3489.

Medlineplus. Guanabenz: MedlinePlus Drug Information [Internet]. Version dated Dec. 22, 2017. Available from: https://web.archive.org/web/20171222153456/https://medlineplus.gov/druginfo/meds/a686003.html (4 pages).

Medow MS, et al. The Postural Tachycardia Syndrome: Cardiology in Review. 2007;15:67-75.

More SS, et al. Vorinostat Increases Expression of Functional Norepinephrine Transporter in Neuroblastoma In Vitro and In Vivo Model Systems. Clin Cancer Res. Apr. 15, 2011;17(8):2339-2349.

National Highway Traffic Safety Administration. Drugs and Human Performance Fact Sheets—Methamphetamine (and Amphetamine) [Internet]. Version dated Feb. 10, 2017. Available from: https://web.archive.org/web/20170210185644/https://one.nhtsa.gov/people/injury/research/job185drugs/methamphetamine.htm (4 pages).

Neurocrine Biosciences. Press Release | Neurocrine Biosciences Announces Urocortin 2 Phase II Study Results in Patients With Acute Decompensated Heart Failure [Internet]. May 17, 2012. Available from: https://neurocrine.gcs-web.com/node/14336/pdf (2 pages).

Newcorn JH, et al. Alpha 2 adrenergic agonists. Neurochemistry, efficacy, and clinical guidelines for use in children. Pediatr Clin North Am. 1998;45:1099-1022, viii.

Newton JL, et al. Symptoms of autonomic dysfunction in chronic fatigue syndrome. QJM Mon J Assoc Physicians. Aug. 2007;100(8):519-526.

Neylan TC, et al. No Improvement of Posttraumatic Stress Disorder Symptoms With Guanfacine Treatment. Am J Psychiatry. Dec. 1, 2006;163(12):2186-2188.

Okamoto LE, et al. Neurohumoral and haemodynamic profile in postural tachycardia and chronic fatigue syndromes. Clin Sci Lond Engl 1979. Feb. 2012;122(4):183-192. PMCID: PMC3203411.

OMIM Entry—* 163970—Solute Carrier Family 6 (Neurotransmitter Transporter, Noradrenaline), Member 2; SLC6A2 [Internet]. Version dated Apr. 30, 2017. Available from: https://web.archive.org/web/20170430045044/http://www.omim.org/entry/163970 (7 pages).

P23975: 3D Model From SWISSMODEL Based On 4xphA—Protein Model Portal—PSI SBKB [Internet]. Version dated Feb. 10, 2025. Available from: https://swissmodel.expasy.org/repository/uniprot/P23975 (2 pages).

Patel K, et al. Comparative pharmacokinetics and pharmacodynamics of urocortins 1, 2 and 3 in healthy sheep. Br J Pharmacol. Jul. 2012;166(6): 1916-1925. PMCID: PMC3402814.

Payer D, et al. Corticotropin-releasing hormone and dopamine release in healthy individuals. Psychoneuroendocrinology. Feb. 2017;76:192-196.

Pena C, et al. Autoimmunity in Syndromes of Orthostatic Intolerance: An Updated Review. J Pers Med. 2024;14:435.

Pilbrow A, et al. Levels of Cardiac Corticotropin-Releasing Factor Type 1 Receptor Gene Expression Are Up-Regulated in Heart Failure and Altered in Association with a Large Inversion Polymorphism That Spans the Gene. San Diego, CA; 2010 p. 3-105.

Pinto, P., et al. "Effects of CPAP on nitrate and norepinephrine levels in severe and mild-moderate sleep apnea." BMC pulmonary medicine 13 (2013): 1-7.

Piquer B, et al. Gestational stress, placental norepinephrine transporter and offspring fertility. Reprod Camb Engl. Feb. 2017;153(2):147-155.

Raj SR, et al. Renin-Aldosterone Paradox and Perturbed Blood Volume Regulation Underlying Postural Tachycardia Syndrome. Circulation. 2005;111:1574-1582.

Wyller VB, et al. Can sustained arousal explain the Chronic Fatigue Syndrome? Behav Brain Funct BBF. 2009;5:10. PMCID: PMC2654901.

Wyller VB, et al. Sympathetic cardiovascular control during orthostatic stress and isometric exercise in adolescent chronic fatigue syndrome. Eur J Appl Physiol. Apr. 2008;102(6):623-632.

Wyller VB. The chronic fatigue syndrome—an update. Acta Neurol Scand Suppl. 2007;187:7-14.

Wyller, V. B., et al. "Altered neuroendocrine control and association to clinical symptoms in adolescent chronic fatigue syndrome: a cross-sectional study." Journal of Translational Medicine 14 (2016): 1-12.

Yang M, et al. Psychometric properties of the PROMIS® Fatigue Short Form 7a among adults with myalgic encephalomyelitis/chronic fatigue syndrome. Qual Life Res. 2019;28:3375-3384.

Zhang Q, et al. Clinical features of hyperadrenergic postural tachycardia syndrome in children. Pediatr Int. 2014;56:813-816.

Zhao G, et al. Functional activation of monoamine transporters by luteolin and apigenin isolated from the fruit of *Perilla frutescens* (L.) Britt. Neurochem Int. Jan. 2010;56(1):168-176.

Ziegenhorn AA, et al. Clonidine Improves Hyperarousal in Borderline Personality Disorder With or Without Comorbid Posttraumatic Stress Disorder: A Randomized, Double-Blind, Placebo-Controlled Trial. J Clin Psychopharmacol. Apr. 2009;29(2):170-173.

Annamalai, B., et al. "Involvement of threonine 258 and serine 259 motif in amphetamine-induced norepinephrine transporter endocytosis." Journal of neurochemistry 115.1 (2010): 23-35.

Avellaneda Fernandez, A., et al. "Chronic fatigue syndrome: aetiology, diagnosis and treatment." BMC psychiatry 9 (2009): 1-11.

Bangasser, D. A., et al. "Sex differences in stress regulation of arousal and cognition." Physiology & behavior 187 (2018): 42-50.

Bartlett, S. J., et al. "Identifying minimal and meaningful change in PROMIS® for rheumatoid arthritis: use of multiple methods and perspectives." Arthritis care & research 74.4 (2022): 588-597.

(56) References Cited

OTHER PUBLICATIONS

Barton, J. "Atomoxetine: a new pharmacotherapeutic approach in the management of attention deficit/hyperactivity disorder." Archives of disease in childhood 90.suppl 1 (2005): i26-i29.
Bayles, R., et al. "Epigenetic modification of the norepinephrine transporter gene in postural tachycardia syndrome." Arteriosclerosis, thrombosis, and vascular biology 32.8 (2012): 1910-1916.
Benarroch, E. E. (Dec. 2012). Postural tachycardia syndrome: a heterogeneous and multifactorial disorder. In Mayo Clinic Proceedings (vol. 87, No. 12, pp. 1214-1225). Elsevier.
Benrud-Larson, L. M., et al. (Jun. 2002). Quality of life in patients with postural tachycardia syndrome. In Mayo Clinic Proceedings (vol. 77, No. 6, pp. 531-537). Elsevier.
Biaggioni, I., et al. "Blood pressure management in afferent baroreflex failure: JACC review topic of the week." Journal of the American College of Cardiology 74.23 (2019): 2939-2947.
Boneva, R. S., et al. "Higher heart rate and reduced heart rate variability persist during sleep in chronic fatigue syndrome: a population-based study." Autonomic Neuroscience 137.1-2 (2007): 94-101.
Bonyhay, I. et al. "Sympathetic nerve activity in response to hypotensive stress in the postural tachycardia syndrome." Circulation 110.20 (2004): 3193-3198.
Bonyhay, I. et al. "Sympathetic neural activity, sex dimorphism, and postural tachycardia syndrome." Annals of neurology 61.4 (2007): 332-339.
Bou-Holaigah, I., et al. "The relationship between neurally mediated hypotension and the chronic fatigue syndrome." Jama 274.12 (1995): 961-967.
Brady, K. T., et al. "Response to corticotropin-releasing hormone infusion in cocaine-dependent individuals." Archives of general psychiatry 66.4 (2009): 422-430.
Brea J. What happens when you have a disease doctors can't diagnose [Internet]. TED Talk presented at: TED; Jan. 2017. Transcript. Available from: http://www.ted.com/talks/jen_brea_what_happens_when_you_have_a_disease_doctors_can_t_diagnose/transcript (17 pages).
Bryarly M, et al. Postural Orthostatic Tachycardia Syndrome. Journal of the American College of Cardiology. 2019;73:1207-1228.
Bymaster F. Atomoxetine Increases Extracellular Levels of Norepinephrine and Dopamine in Prefrontal Cortex of Rat A Potential Mechanism for Efficacy in Attention Deficit/Hyperactivity Disorder. Neuropsychopharmacology. Nov. 2002;27(5):699-711.
CDC—Myalgic Encephalomyelitis/Chronic Fatigue Syndrome (CFS) [Internet]. Version dated Dec. 6, 2019. Available from: https://web.archive.org/web/20181206193317/https://www.cdc.gov/me-cfs/ (5 pages).
Collin, S. M., et al. "Chronic fatigue syndrome (CFS) symptom-based phenotypes in two clinical cohorts of adult patients in the UK and The Netherlands." Journal of psychosomatic research 81 (2016): 14-23.
Cornish, L. A. "Guanfacine hydrochloride: a centrally acting antihypertensive agent." Clinical pharmacy 7.3 (1988): 187-197.
Costa, F., et al. "Role of adenosine in the sympathetic activation produced by isometric exercise in humans." The Journal of clinical investigation 93.4 (1994): 1654-1660.
Costigan, A., et al. "Orthostatic symptoms predict functional capacity in chronic fatigue syndrome: implications for management." QJM: An International Journal of Medicine 103.8 (2010): 589-595.
De Baets, G. et al. "SNPeffect 4.0: on-line prediction of molecular and structural effects of protein-coding variants." Nucleic acids research 40.D1 (2012): D935-D939.
De Lorenzo, F., J. et al. "Pathogenesis and management of delayed orthostatic hypotention in patients with chronic fatigue syndrome." Clinical Autonomic Research 7 (1997): 185-190.
Delius, W., et al. "General characteristics of sympathetic activity in human muscle nerves." Acta Physiologica Scandinavica 84.1 (1972): 65-81.

Diedrich, A., et al. "Analysis of raw microneurographic recordings based on wavelet de-noising technique and classification algorithm: wavelet analysis in microneurography." IEEE Transactions on Biomedical Engineering 50.1 (2003): 41-50.
Eliot, L., et al. "Sex in context: limitations of animal studies for addressing human sex/gender neurobehavioral health disparities." Journal of Neuroscience 36.47 (2016): 11823-11830.
Eshragh, J., et al. "Associations between neurotransmitter genes and fatigue and energy levels in women after breast cancer surgery." Journal of pain and symptom management 53.1 (2017): 67-84.
Fagermoen, E., et al. "Clonidine in the treatment of adolescent chronic fatigue syndrome: a pilot study for the NorCAPITAL trial." BMC research notes 5 (2012): 1-6.
Fagermoen, E., et al. "Effects of low-dose clonidine on cardiovascular and autonomic variables in adolescents with chronic fatigue: a randomized controlled trial." BMC pediatrics 15 (2015): 1-12.
Faraone SV, et al. Effects of Extended-Release Guanfacine on ADHD Symptoms and Sedation-Related Adverse Events in Children With ADHD. J Atten Disord. Mar. 2010;13(5):532-538.
Freeman R, et al. Consensus statement on the definition of orthostatic hypotension, neurally mediated syncope and the postural tachycardia syndrome. Autonomic Neuroscience. 2011;161:46-48.
Freeman R. The chronic fatigue syndrome is a disease of the autonomic nervous system. Sometimes. Clin Auton Res Off J Clin Auton Res Soc. Aug. 2002;12(4):231-233.
Fu Q, et al. Cardiac Origins of the Postural Orthostatic Tachycardia Syndrome. Journal of the American College of Cardiology. 2010;55:2858-2868.
Furlan R, et al. Chronic orthostatic intolerance: a disorder with discordant cardiac and vascular sympathetic control. Circulation. 1998;98:2154-2159.
Gaffney FA, et al. Effects of long-term clonidine administration on the hemodynamic and neuroendocrine postural responses of patients with dysautonomia. Chest. 1983;83:436-438.
Garland EM, et al. Effect of High Dietary Sodium Intake in Patients With Postural Tachycardia Syndrome. Journal of the American College of Cardiology. 2021;77:2174-2184.
Garland EM, et al. The hemodynamic and neurohumoral phenotype of postural tachycardia syndrome. Neurology. Aug. 21, 2007;69(8):790-798.
Gerrity TR, et al. Chronic fatigue syndrome: what role does the autonomic nervous system play in the pathophysiology of this complex illness? Neuroimmunomodulation. 2002 2003;10(3):134-141.
Gilsbach R, et al. Norepinephrine transporter knockout-induced up-regulation of brain alpha2A/C-adrenergic receptors. J Neurochem. Feb. 2006;96(4):1111-1120.
Goldstein DS, et al. Plasma dihydroxyphenylglycol and the intraneuronal disposition of norepinephrine in humans. J Clin Invest. 1988;81:213-220.
Gormley L, et al. Clonidine and guanfacine IR vs ER: Old drugs with "new" formulations. Ment Health Clin. Jan. 2014;4(1):22-26.
Green EA, et al. Effects of Norepinephrine Reuptake Inhibition on Postural Tachycardia Syndrome. J Am Heart Assoc. Sep. 3, 2013;2(5):e000395-e000395.
Hahn MK, et al. A mutation in the human norepinephrine transporter gene (SLC6A2) associated with orthostatic intolerance disrupts surface expression of mutant and wild-type transporters. J Neurosci Off J Soc Neurosci. Jun. 1, 2003;23(11):4470-4478.
Hahn MK, et al. Novel and functional norepinephrine transporter protein variants identified in attention-deficit hyperactivity disorder. Neuropharmacology. Dec. 2009;57(7-8):694-701.
Hall, K. T., et al. "Genetic variation in catechol-O-methyltransferase modifies effects of clonidine treatment in chronic fatigue syndrome." The pharmacogenomics journal 16.5 (2016): 454-460.
Harmon RJ, et al. Clonidine for Posttraumatic Stress Disorder in Preschool Children. J Am Acad Child Adolesc Psychiatry. Sep. 1996;35(9):1247-1249.
Heagerty, P. J. et al. "Time-dependent ROC curves for censored survival data and a diagnostic marker." Biometrics 56.2 (2000): 337-344.

(56) References Cited

OTHER PUBLICATIONS

Henckens MJAG, et al. CRF receptor type 2 neurons in the posterior bed nucleus of the stria terminalis critically contribute to stress recovery. Mol Psychiatry. Dec. 2017;22(12):1691-1700.

Hendrickson, R. C., et al. "Evidence for altered brain reactivity to norepinephrine in Veterans with a history of traumatic stress." Neurobiology of stress 8 (2018): 103-111.

* cited by examiner

METHODS OF TREATING TRIGEMINAL NERVE PAIN

CROSS REFERENCE TO RELATED APPLICATIONS

This patent application is the U.S. national stage entry, under 35 U.S.C. § 371, of International Application Number PCT/US2020/020236, filed Feb. 7, 2020, which claims priority to U.S. Provisional Application No. 62/811,258, filed Feb. 27, 2019, the entire contents of each of which are hereby incorporated by reference.

TECHNICAL FIELD

Provided are methods for treating trigeminal nerve pain in a subject in need thereof comprising administering to the subject a therapeutically effective amount of guanfacine and optionally lidocaine.

BACKGROUND

Trigeminal nerve pain includes conditions affecting cranial nerve V (trigeminal nerve) that transmits sensation from the face. Painful trigeminal neuropathy and trigeminal neuralgia are severely painful conditions affecting the trigeminal nerve. The current treatment strategy for trigeminal neuralgia and painful trigeminal neuropathy includes the use of neuropathic pain medications (carbamazepine, oxcarbazepine, gabapentin, lamotrigine) and interventional procedures ranging from conservative local blocks to more invasive ablative procedures.

Traditionally, anticonvulsant and antidepressant medications are used to raise the threshold for neural signaling and reduce the severity of neuropathic pain sensed by the patient. Acute and chronic neuropathic pain treatment with these classes of medications is often insufficient, and opioids are added with the understanding of their accompanying risks and decreasing long-term benefits.

Interventional or surgical procedures are offered to patients with intractable trigeminal nerve pain when standard medical therapy fails. The interventional procedures often begin with diagnostic regional block with local anesthetic to ensure peripheral treatment of first-order neurons adequately relieves the patient's pain. Further treatments include repeat regional blocks with addition of adjunctive medications (i.e., steroids or botulinum toxin), or progression to trigeminal nerve ablation via radio-frequency or balloon compression, or radiotherapy.

There is a need therefore for effective therapies to treat trigeminal neuropathy that provide durable, longer-lasting neuropathic pain relief without debilitating side-effects of the currently used medications or recurrence levels of the currently used interventional procedures.

SUMMARY

In an aspect, the disclosure relates to methods for treating trigeminal nerve pain in a subject in need thereof. The method may include administering to the subject by perineural injection of the trigeminal nerve a therapeutically effective amount of a composition comprising an alpha-2 adrenergic agonist, or a pharmaceutically acceptable salt thereof.

In some embodiments, the trigeminal nerve pain may be trigeminal neuralgia. In some embodiments, the trigeminal nerve pain may be trigeminal neuropathy. In some embodiments, the alpha-2 adrenergic agonist may be clonidine, p-aminoclionidine, tiamenidine, 5-bromo-6-(2 imidazolidine-2-ylamino) quinoxaline, dexmedetomidine, detomidine, medetomidine, oxymetazonline, brimonidine, tizanidine, mivazerol (UCB-Pharma, Belgium), lofexidine, xylazine, guanabenz, guanfacine, guanclofine, guanoxabenz, alpha-methyinorepherine, azepexole, indoramin, 6-allyl-2-amino-5,6,7,8-tetrahydro4H-thiazolo [4,5-d] azepine diHCl, or a combination thereof. In some embodiments, the alpha-2 adrenergic agonist may be guanfacine. In some embodiments, the composition may include about 100 μg to about 400 μg guanfacine. In some embodiments, the composition may include about 250 μg guanfacine. In some embodiments, the composition further may include an anesthetic. In some embodiments, the composition further may include lidocaine. In some embodiments, the composition may include about 30 to about 120 mg lidocaine. In some embodiments, the composition may include about 60 mg lidocaine. In some embodiments, a second composition comprising an anesthetic may be administered to the subject. In some embodiments, the second composition may include about 60 mg lidocaine. In some embodiments, the second composition may be administered by perineural injection of the trigeminal nerve. In some embodiments, the second composition may be administered to the subject before the composition comprising guanfacine may be administered to the subject. In some embodiments, the administration of the composition comprising guanfacine and the administration of the second composition may be sequential and separated by a period of time.

In a further aspect, the disclosure relates to a method for treating trigeminal nerve pain in a subject in need thereof. The method may include injecting at the trigeminal nerve of the subject a composition that may include lidocaine; and injecting at the trigeminal nerve of the subject a therapeutically effective amount of a composition that may include guanfacine and lidocaine.

In some embodiments, the trigeminal nerve pain may be trigeminal neuralgia or trigeminal neuropathy. In some embodiments, the composition that may include guanfacine and lidocaine comprises about 250 μg guanfacine and about 60 mg lidocaine.

Another aspect of the disclosure provides an injectable pharmaceutical composition that may include about 100 μg to about 400 μg guanfacine and about 30 mg to about 120 mg lidocaine.

In some embodiments, the composition may comprise about 250 μg guanfacine. In some embodiments, the composition may comprise about 60 mg lidocaine. In some embodiments, the composition further may comprise a pharmaceutically acceptable carrier. In some embodiments, the pharmaceutically acceptable carrier may be water. In some embodiments, the composition may be administered to the subject by perineural injection of the trigeminal nerve.

In some embodiments, the subject may have a single nucleotide polymorphism in ADRA2B gene. In some embodiments, the single nucleotide polymorphism in the ADRA2B gene may be a missense mutation. In some embodiments, the missense mutation may be a Val (376) mutated to an Ile (376).

In some embodiments, the pain is measured by a visual analog scale (VAS) score. In some embodiments, the VAS score may be less than 5 following administration of the composition.

In some embodiments, the alpha-2 adrenergic agonist may comprise a compound of the formula

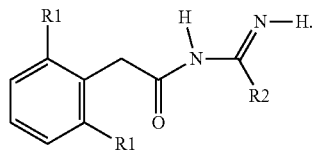

In some embodiments, the R1 group may be chloro or methyl and the R2 group may be a lower alkoxy, a lower alkylthio, an amine, or a p-nitrobenzylthio.

Other aspects of the invention will become apparent by consideration of the accompanying description.

DETAILED DESCRIPTION

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

As used herein, the terms "administering," "providing" and "introducing" are used interchangeably herein and refer to the placement of the compositions of the disclosure into a subject by a method or route which results in at least partial localization of the composition to a desired site. The compositions can be administered by any appropriate route which results in delivery to a desired location in the subject.

As used herein, the terms "effective amount" or "therapeutically effective amount," refer to a sufficient amount of an agent or a composition or combination of compositions being administered which will relieve to some extent one or more of the symptoms of the disease or condition being treated. The result can be reduction and/or alleviation of the signs, symptoms, or causes of a disease, or any other desired alteration of a biological system. For example, an "effective amount" for therapeutic uses is the amount of the composition comprising a compound as disclosed herein required to provide a clinically significant decrease in disease symptoms. An appropriate "effective" amount in any individual case may be determined using techniques, such as a dose escalation study. The dose could be administered in one or more administrations. However, the precise determination of what would be considered an effective dose may be based on factors individual to each patient, including, but not limited to, the patient's age, size, type or extent of disease, stage of the disease, route of administration of the regenerative cells, the type or extent of supplemental therapy used, ongoing disease process and type of treatment desired (e.g., aggressive vs. conventional treatment).

As used herein, the term "lidocaine," also known as lignocaine, encompasses all forms of lidocaine. The lidocaine may be in alternative forms or salts including, for example, xylocaine or lidocaine HCl.

As used herein, the term "perineural" refers to administration directly to, proximal to or within the tissues surrounding at least one nerve of a subject.

As used herein, the terms "subject" and "patient" may be used interchangeably to refer to any vertebrate including, but not limited to, a mammal and a human. In some embodiments, the subject may be a human or a non-human. The subject or patient may be undergoing forms of treatment.

As used herein, the term "mammal" refers to any member of the class Mammalia including, without limitation, humans and nonhuman primates such as chimpanzees and other apes and monkey species; farm animals such as cattle, sheep, pigs, goats, llamas, camels, and horses; domestic mammals such as dogs and cats; laboratory animals including rodents such as mice, rats, rabbits, guinea pigs, and the like. The term does not denote a particular age or sex. Thus, adult and newborn subjects, as well as fetuses, whether male or female, are intended to be included within the scope of this term.

As used herein, the terms "treat," "treating" or "treatment" are each used interchangeably to describe reversing, alleviating, or inhibiting the progress of a disease and/or injury, or one or more symptoms of such disease, to which such term applies. Depending on the condition of the subject, the term may also refer to preventing a disease, and includes preventing the onset of a disease, or preventing the symptoms associated with a disease. A treatment may be either performed in an acute or chronic way. The term also refers to reducing the severity of a disease or symptoms associated with such disease prior to affliction with the disease. Such prevention or reduction of the severity of a disease prior to affliction refers to administration of a pharmaceutical composition to a subject that is not at the time of administration afflicted with the disease. "Preventing" also refers to preventing the recurrence of a disease or of one or more symptoms associated with such disease.

"Treatment" and "therapeutically," refer to the act of treating, as "treating" is defined above.

As used herein, "lower alkyl" refers to an unbranched saturated hydrocarbon chain of 1-4 carbons, such as, methyl, ethyl, n-propyl, and n-butyl.

As used herein "lower alkoxy" refers to a group —OR, wherein R is a lower alkyl as herein defined.

As used herein "lower alkylthio" refers to a group —SR, wherein R is a lower alkyl as herein defined.

As used herein "pharmaceutically acceptable salt" refers to those salts which retain the biological effectiveness and properties of the free bases and which are not biologically or otherwise undesirable, formed with inorganic acids such as hydrochloric acid, hydrobromic acid, sulfuric acid, nitric acid, phosphoric acid and the like, and organic acids such as acetic acid, propionic acid, glycolic acid, pyruvic acid, oxalic acid, malic acid, malonic acid, succinic acid, maleic acid, fumaric acid, tartaric acid, citric acid, benzoic acid, cinnamic acid, mandelic acid, menthanesulfonic acid, ethanesulfonic acid, p-toluenesulfonic acid, salicylic acid and the like.

2. TRIGEMINAL NERVE PAIN

The latest classification (ICHD-3) by the International Headache Society (IHS) distinguishes trigeminal nerve pain into trigeminal neuralgia and painful trigeminal neuropathy. Classical trigeminal neuralgia includes cases that develop idiopathically or secondary to neurovascular compression. This compression causes wearing away of or damage to the protective coating around the nerve. Trigeminal neuralgia is defined clinically by paroxysmal, stereotyped attacks of usually intense, sharp, superficial, or stabbing pain in the distribution of one or more branches of the trigeminal nerve. The pain of trigeminal neuralgia tends to occur in paroxysms and is maximal at or near onset. Facial muscle spasms can be seen with severe pain.

Painful trigeminal neuropathy is caused by structural abnormalities or neural damage rather than vascular compression. Painful trigeminal neuropathy affects one or more branches of the trigeminal nerve, most often the second (V2, maxillary) or third (V3, mandibular) division. Common causes of painful trigeminal neuropathy include multiple sclerosis, tumors, acute herpes zoster, post-chemotherapy neuritis, post-radiation therapy neuritis, and space occupying abnormalities. The pain associated with painful trigeminal neuropathy is highly variable in quality and intensity. Painful trigeminal neuropathy is characterized by continuous or near-continuous facial pain often described subjectively as burning, squeezing, electrical, or likened to pins and needles.

The methods described herein may be used to treat any cause of pain associated with the trigeminal nerve, including, for example trigeminal neuralgia or trigeminal neuropathy.

3. ALPHA-2 ADRENERGIC RECEPTOR

The alpha-2 adrenoreceptor has important roles in signaling within and between both the peripheral and central nervous systems. Stimulation of the alpha-2 adrenoreceptor may suppress calcium entry into the nerve terminal. It has been postulated that this dynamic is responsible for its inhibitory effect on secretion of neurotransmitters, leading to interruption of the propagation of pain signals. Both central and peripheral alpha-2 adrenoreceptors are proposed to mediate interruption of pain signaling by this mechanism. In humans, both the alpha-2A and -2B subtypes are expressed in the spinal cord and have been shown to be involved in antinociceptive activity. Alpha-2 adrenergic agonists mitigate postoperative neuropathic pain in rats.

i. Alpha-2 Adrenergic Receptor Agonists

Alpha-2 adrenergic agonists include, for example, clonidine, p-aminoclionidine, tiamenidine, 5-bromo-6-(2 imidazolidine-2-ylamino) quinoxaline, dexmedetomidine, detomidine, medetomidine, oxymetazonline, brimonidine, tizanidine, mivazerol (UCB-Pharma, Belgium), lofexidine, xylazine, guanabenz, guanfacine, guanclofine, guanoxabenz, or a derivative or structural analogue thereof, alpha-methyinorepherine, azepexole, indoramin, 6-allyl-2-amino-5,6,7,8-tetrahydro4H-thiazolo [4,5-d]azepine diHCl, and analogs thereof.

Further, alpha-2 adrenergic agonists may include substituted phenylacetyl derivatives of guanidine, O-alkylisoureas, S-alkylisothioureas, and P-nitrobenzylisothiourea as described in U.S. Pat. No. 3,632,645, which is incorporated herein by reference in its entirety. These compounds, acetyl-guanidines, and/or pharmaceutically acceptable salts thereof, may be useful in the methods of treatment described herein.

Disclosed herein are acetyl-guanidines and compounds of general Formula I,

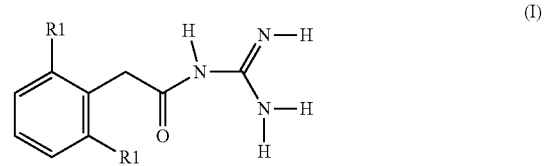

in which R1 signifies a chlorine atom or the methyl radical, and their tautomeric compounds of general Formula Ia,

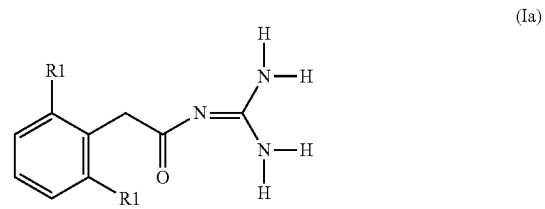

in which R1 has the above significance, and their acid addition salts.

In the following description for the sake of brevity, a reference to compounds of general Formula I is intended also to embrace the tautomeric compounds of Formula Ia. The compounds of general Formula I and their acid addition salts may be obtained by a process characterized either by (a) reacting a compound of general Formula II,

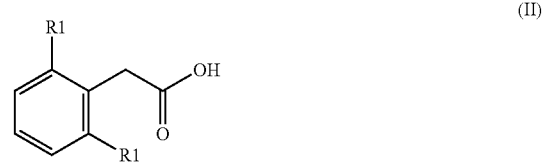

in which R1 has the above significance, or a reactive, functional acid derivative thereof, with guanidine, or (b) reacting with ammonia a compound of general Formula III,

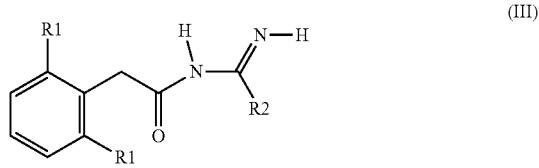

in which R1 has the above significance, and R2 signifies a reactive radical capable of being split off together with one of the hydrogen atoms in ammonia, and when the resulting compound of Formula I is obtained in the form of a salt, optionally liberating the free base therefrom, and/or when the resulting compound of Formula I is obtained in the free base form, optionally salifying it.

In the process described, suitable reactive, functional acid derivatives of the compounds of Formula II include halides preferably chlorides or bromides, and lower alkyl esters. When a halide is used and it is desired to obtain the compound of Formula I in the form of a free base directly, the reaction may be effected in the presence of an acid binding agent e.g. triethyl-amine, or by using at least a 100% excess of guanidine. It will be appreciated that in the absence of such an acid binding agent or excess of guanidine, a salt of the compound of Formula I may be obtained, from which the free base may be liberated in manner known per se, e.g., by treatment with dilute aqueous alkali metal hydroxide solutions.

The reaction described is preferably carried out in the presence of an organic solvent which is inert under the reaction conditions e.g. isopropanol or toluene. It may be carried out at a temperature between room temperature (20-25° C.) and the reflux temperature of the reaction medium, preferably between room temperature and 80° C. The progress of reaction may be followed by, for example, thin layer chromatography.

In another process, suitable starting materials include, for example, those wherein the reactive radical is a lower alkoxy, lower alkylthio or a substituted or unsubstituted aralkylthio radical, especially a methoxy, methylthio, or n-nitrobenzylthio radical. The reaction is preferably effected in an organic solvent which is inert under reaction conditions e.g. isopropanol. The ammonia reactant is suitably in the form of a concentrated aqueous solution and the reaction mixture may be stirred at a temperature between 20° and 80° C. for 6 to 24 hours in order to complete the reaction.

The compounds of Formula I produced in accordance with the above processes may be isolated in manner known per se e.g. by extraction, precipitation or salt for-mation, and may be purified in manner known per se e.g. by recrystallization.

The compounds of general Formula I may be solid, basic compounds at room temperature. They may be converted into their acid addition salts by reacting with suitable organic or inorganic acids. Suitable organic acids for acid addition salts formation include toluene sulphonic acid, acetic acid, malonic acid, succinic acid, malic acid, maleic acid, and tartaric acid and suitable inorganic acids include hydrohalic acids, sulphuric acid, nitric acid and phosphoric acid.

The compounds of general Formula II used as starting materials are known; the functional acid derivatives of compounds of general Formula II used in accordance with the invention are known or may be produced in manner known per se.

The compounds of general Formula III used as starting materials are known. The compounds of Formula III may be prepared by reacting a halide preferably a chloride or bromide, of a compound of Formula II with a compound of Formula VII,

in which R2 has the above significance.

The process may be carried out in an organic solvent which is inert under the reaction conditions e.g. acetone, preferably at room temperature. Preferred reactants of Formula VII are compounds wherein the carbon atom carries a lower alkoxy, lower alkylthio or a substituted or unsubstituted aralkylthio radical, especially a methoxy, methylthio, or p-nitrobenzylthio radical as substituent. When said substituent is a substituted or unsubstituted aralkylthio radical, an excess of the reactant is preferably used.

The resulting compounds of general Formula III may be isolated in manner known per se, e.g. by precipitating with a precipitant, and may subsequently be purified in a manner known per se, e.g., by recrystallization.

The compounds of general Formula VII used as starting materials for the above process are known or may be produced in manner known per se.

The compounds of general Formula I and their pharmaceutically acceptable acid addition salts are useful because they possess pharmacological activity in animals. They are useful as antihypertensives having a beneficial effect particularly with regard to essential and renal hypertonia, as indicated by the "nictitating membrane" test in cats.

The antihypertensive effect is demonstrated by a subsiding of the contraction of the nictitating membrane in cats in the case of preganglionic and postganglionic stimulus of the neck sympathicus. In order to measure this effect the dose of active compound (ED50) is ascertained with which a 50% reduction of the nictitating membrane contraction occurs. The following table gives a comparison of the values ascertained for the 2,6-disubstituted phenyl-acetylguanidines of the invention with those of guanethidine known as the most effective antihypertensive, whereby the superiority of the compounds of the invention is demonstrated.

| Active compound: | Reduction of the neck sympathicus stimulus ED50 mg./kg. i.v. (cats) |
| --- | --- |
| 2,6-dichlorophenyl-acetyl-guanidine | 0.3 |
| 2,6-dimethylphenyl-acetyl-guanidine | 1.0 |
| Guanethidine | 2.0 |

For the above-mentioned use, the dosage administered will, of course, vary depending upon the compound employed, mode of administration and treatment desired. However, in general, satisfactory results are obtained for the larger mammals at a total daily dosage in the range of from about 1 to about 10 mg., and dosage forms suitable for oral administration, e.g. as tablets, dragees, or for parenteral administration, e.g. as injectable solutions, comprise from about 1 to 2 mg of the compound administered with a solid or liquid pharmaceutical carrier or diluent.

Guanfacine is the oldest alpha-2 adrenergic agonist in clinical use in this class. It preferentially binds to α-2A adrenergic receptor and has 15- to 20-fold greater affinity for α-2A adrenergic receptor compared to α-2B and α-2C adrenergic receptor. Of the alpha-2 agonists, guanfacine has the lowest rate of sedation. Guanfacine is currently approved in tablet form for the treatment of hypertension (1 to 2 mg) and Attention Deficit Hyperactivity Disorder (1 to 4 mg). Guanfacine has also been used off-label for the treatment of Tourette's syndrome, autism, and post-trauma stress disorder and has been proposed as a treatment option for withdrawal syndrome of opioids. Guanfacine has the chemical name N-amidino-2-(2,6-dichlorophenyl) acetamide. Guanfacine is well known in the industry and FDA approved in the HCl salt form.

Guanfacine is readily absorbed with around 80% oral bioavailability and has an elimination half-life of ~17 h with renal excretion accounting for ~50%. Guanfacine has been shown to have similar in vitro potency as clonidine to inhibit conduction in rat sciatic nerve fibers. Intrathecal guanfacine has a similar antinociceptive effect as that of intrathecal clonidine in a goat model. Guanfacine showed longer antinociceptive effect in comparison to clonidine (8 h vs. 5 h) due to slower elimination of guanfacine from spinal cord tissue. In a rat model, intrathecal guanfacine has shown anti-nociceptive effect for greater than 18 h (both 25 mcg and 50 mcg) in comparison to clonidine injection (50 mcg) which declined to baseline within 4 h. Additionally, a lower rate of elimination of guanfacine from spinal cord tissue compared to clonidine was reported.

Highly concentrated guanfacine (75 mcg in 15 μl saline) solution administered through an intrathecal route has been shown to be nontoxic in the subarachnoid space, establishing the safe use of guanfacine for perineural blockade. Guanfacine, as studied in animals and used in humans, has a safe risk profile, suggesting that it may be repurposed for other indications. Guanfacine has the potential to be developed as a safe, non-opioid, analgesic for acute and chronic debilitating pain. Guanfacine in combination with 1% lidocaine, as described in the methods herein, may provide a safe and efficacious treatment for extended duration of pain relief in painful trigeminal neuropathy patients who are not able to obtain pain relief from standard neuropathic pain medication.

Guanfacine may be a guanfacine hydrochloride (HCl) powder that is active pharmaceutical ingredient (API) grade with the following structural formula:

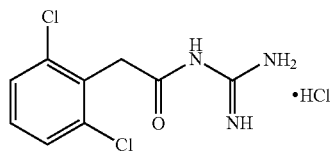

The guanfacine as described herein may be Tenex® (guanfacine hydrochloride) with the chemical formula N-amidino-2-(2,6-dichlorophenyl) acetamide hydrochloride and its molecular weight is 282.56.

ii. Combination of Alpha-2 Adrenergic Receptor Agonists and Lidocaine

α2 adrenergic receptor agonists slow the clearance of lidocaine from the skin, thereby prolonging the effect of anesthesia (Zhang Int J Pharm. 2012 Dec. 15; 439(1-2):187-92). In the methods described herein, guanfacine may have a similar effect of delaying systemic absorption and slowing lidocaine clearance from the nerve, and prolonging pain relief. In addition to analgesic properties for neuropathic pain, guanfacine may also act as an adjuvant to prolong pain relief from an anesthetic, such as lidocaine, when the combination is delivered to the nerve. Therefore, guanfacine may act by a dual mechanism to relieve trigeminal nerve pain.

4. METHODS OF TREATING TRIGEMINAL NERVE PAIN

One aspect of the invention described herein encompasses methods for treating trigeminal nerve pain in a subject. The methods may decrease the severity of the pain experienced in the subject, may decrease the frequency of the pain attacks, may decrease the length of the pain attacks, may decrease the susceptibility of the subject to triggers of pain, may increase the quality of life of the patient, or a combination thereof. In some embodiments, the nerve pain is trigeminal neuralgia. In some embodiments, the nerve pain is trigeminal neuropathy.

The trigeminal nerve pain may be an acute or chronic pain. Some forms of acute pain can develop into chronic pain through a progressive and complex process. Repeated acute injury, opioid-induced hyperalgesia, neuroinflammation, comorbid psychiatric conditions, and modification of pain processing systems have been linked to the development of chronic pain states. Prolonged inflammation and degenerative conditions from tissue damage following an injury or surgery can lead to a cascade of neural dysfunction that ultimately results in peripheral and central nervous system sensitization. In some embodiments, the methods may prevent the transition of acute trigeminal nerve pain from developing into a chronic pain state.

The method may comprise administering a therapeutically effective amount of a composition comprising an alpha-2 adrenergic agonist or a pharmaceutically acceptable salt thereof to a subject in need thereof. The method may comprise administering to the subject by perineural injection of the trigeminal nerve a therapeutically effective amount of a composition comprising an alpha-2 adrenergic agonist. The alpha-2 adrenergic agonist may comprise at least one of the group consisting of clonidine, p-aminoclionidine, tiamenidine, 5-bromo-6-(2 imidazolidine-2-ylamino) quinoxaline, dexmedetomidine, detomidine, medetomidine, oxymetazonline, brimonidine, tizanidine, mivazerol (UCB-Pharma, Belgium), lofexidine, xylazine, guanabenz, guanfacine, guanclofine, guanoxabenz, or a derivative or structural analogue thereof, alpha-methyinorepherine, azepexole, indoramin, 6-allyl-2-amino-5,6,7,8-tetrahydro4H-thiazolo[4,5-d]azepine diHCl, analogs thereof, and combinations thereof. In one particularly suitable embodiment, the alpha-2 adrenergic agonist may include guanfacine.

The composition may comprise about 100 to about 400 μg alpha-2 adrenergic agonist. The composition may comprise at least about 100 μg, at least about 110 μg, at least about 130 μg, at least about 150 μg, at least about 170 μg, at least about 190 μg, at least about 210 μg, at least about 230 μg, at least about 250 μg, at least about 270 μg, at least about 290 μg, at least about 310 μg, at least about 330 μg, at least about 350 μg, at least about 370 μg, or at least about 390 μg alpha-2 adrenergic agonist. The composition may comprise less than about 400 μg, less than about 390 μg, less than about 370 μg, less than about 350 μg, less than about 330 μg, less than about 310 μg, less than about 290 μg, less than about 270 μg, less than about 250 μg, less than about 230 μg, less than about 210 μg, less than about 190 μg, less than about 170 μg, less than about 150 μg, less than about 130 μg, or less than about 110 μg alpha-2 adrenergic agonist.

In some embodiments, the composition may comprise about 100 to about 400 μg guanfacine. The composition may comprise at least about 100 µg, at least about 120 µg, at least about 140 µg, at least about 160 µg, at least about 180 µg, at least about 200 µg, at least about 220 µg, at least about 240 µg, at least about 260 µg, at least about 280 µg, at least about 300 µg, at least about 320 µg, at least about 340 µg, at least about 360 µg, or at least about 380 µg guanfacine. The composition may comprise less than about 400 µg, less than about 380 µg, less than about 360 µg, less than about 340 µg, less than about 320 µg, less than about 300 µg, less than about 280 µg, less than about 260 µg, less than about 240 µg, less than about 220 µg, less than about 200 µg, less than about 180 µg, less than about 160 µg, less than about 140 µg, or less than about 120 µg guanfacine. In some embodiments, the composition may comprise about 250 µg guanfacine.

The injection of the composition comprising alpha-2 adrenergic agonist may be a perineural injection of the trigeminal nerve. The injection may be a peripheral nerve block. A peripheral nerve block refers to a percutaneous injection of a peripheral nerve with or without a nerve stimulator to find and approach the nervous structure. The main advantages to peripheral nerve blocks are to selectively restrict the analgesic effect to one sensitive territory and to allow loco-regional analgesia in patients for whom the coagulation parameters are not optimal. In consequence, the problems related to placement of an invasive drug delivery system can be strongly minimized. Health-related quality of life, patient satisfaction and economic assessment might be improved with such a treatment, especially in chronic pain conditions.

The composition may further comprise a local anesthetic. Local anesthetics include, for example, lidocaine, mepivacaine, bupivacaine, etidocaine, prilocaine, ropivicaine, articaine, chloroprocaine, benzocaine, procaine, tetracaine, levobupivacaine or a combination thereof. The local anesthetic may be lidocaine. Lidocaine is also known as lignocaine.

The composition may comprise about 30 mg to about 120 mg lidocaine. The composition may comprise at least about 30 mg, at least about 40 mg, at least about 50 mg, at least about 60 mg, at least about 70 mg, at least about 80 mg, at least about 90 mg, at least about 100 mg, or at least about 110 mg lidocaine. The composition may comprise less than about 120 mg, less than about 110 mg, less than about 100 mg, less than about 90 mg, less than about 80 mg, less than about 70 mg, less than about 60 mg, less than about 50 mg, or less than about 40 mg lidocaine. The composition may comprise about 60 mg lidocaine.

The method may further comprise administering a second composition comprising an anesthetic to the subject. The second composition may comprise about 30 mg to about 120 mg lidocaine. The second composition may comprise at least about 30 mg, at least about 40 mg, at least about 50 mg, at least about 60 mg, at least about 70 mg, at least about 80 mg, at least about 90 mg, at least about 100 mg, or at least about 110 mg lidocaine. The second composition may comprise less than about 120 mg, less than about 110 mg, less than about 100 mg, less than about 90 mg, less than about 80 mg, less than about 70 mg, less than about 60 mg, less than about 50 mg, or less than about 40 mg lidocaine. The second composition may comprise about 60 mg lidocaine.

The injection of the second composition may be a perineural injection of the trigeminal nerve. The injection may be a peripheral nerve block.

The second composition may be administered to the subject before the administration of the composition comprising alpha-2 adrenergic agonist (e.g., guanfacine). The second composition may be administered to the subject after the administration of the composition comprising alpha-2 adrenergic agonist. In some embodiments, the administration of the composition comprising alpha-2 adrenergic agonist and lidocaine and the administration of the second composition comprising lidocaine are sequential. In some embodiments, the administration of the composition comprising alpha-2 adrenergic agonist and lidocaine and the administration of the second composition comprising lidocaine are separated by a period of time. The period of time may range from seconds, to minutes, to hours.

In an alternative embodiment, the method of treating trigeminal nerve pain may comprise injecting at the trigeminal nerve of the subject a composition comprising lidocaine and injecting at the trigeminal nerve of the subject a therapeutically effective amount of a composition comprising alpha-2 adrenergic agonist and lidocaine. The trigeminal nerve pain may be trigeminal neuropathy, trigeminal neuralgia, or a combination thereof. In some embodiments, the composition comprising guanfacine and lidocaine comprises about 250 µg guanfacine and about 60 mg lidocaine.

The methods may be repeated, as needed, to provide and maintain therapeutically effective treatment of trigeminal nerve pain.

5. PHARMACEUTICAL COMPOSITION

The disclosed compositions may be incorporated into pharmaceutical compositions suitable for administration to a subject (such as a patient, which may be a human or non-human). The pharmaceutical composition may be prepared for administration to a subject. Such pharmaceutical compositions can be administered in dosages and by techniques well known to those skilled in the medical and pharmaceutical arts taking into consideration such factors as the age, sex, weight, and condition of the particular subject, and the route of administration.

The pharmaceutical compositions may include pharmaceutically acceptable carriers. As used herein, the term "pharmaceutically acceptable carrier," refers to a non-toxic, inert solid, semi-solid or liquid filler, diluent, encapsulating material or formulation auxiliary of any type. Some examples of materials which can serve as pharmaceutically acceptable carriers are sugars such as, but not limited to, lactose, glucose and sucrose; starches such as, but not limited to, corn starch and potato starch; cellulose and its derivatives such as, but not limited to, sodium carboxymethyl cellulose, ethyl cellulose and cellulose acetate; powdered tragacanth; malt; gelatin; talc; excipients such as, but not limited to, cocoa butter and suppository waxes; oils such as, but not limited to, peanut oil, cottonseed oil, safflower oil, sesame oil, olive oil, corn oil and soybean oil; glycols; such as propylene glycol; esters such as, but not limited to, ethyl oleate and ethyl laurate; agar; buffering agents such as, but not limited to, magnesium hydroxide and aluminum hydroxide; alginic acid; pyrogen-free water; isotonic saline; Ringer's solution; ethyl alcohol, and phosphate buffer solutions, as well as other non-toxic compatible lubricants such as, but not limited to, sodium lauryl sulfate and magnesium stearate, as well as coloring agents, releasing agents, coating agents, sweetening, flavoring and perfuming agents, preservatives and antioxidants can also be present in the composition, according to the judgment of the formulator. The route by which the composition is administered and the form of the composition will dictate the type of carrier to be used.

One aspect of the invention described herein encompasses an injectable pharmaceutical composition comprising alpha-2 adrenergic agonist (e.g., guanfacine) and lidocaine.

The pharmaceutical composition may comprise about 100 to about 400 µg alpha-2 adrenergic agonist (e.g., guanfacine). The composition may comprise at least about 100 µg, at least about 110 µg, at least about 130 µg, at least about 150 µg, at least about 170 µg, at least about 190 µg, at least about 210 µg, at least about 230 µg, at least about 250 µg, at least about 270 µg, at least about 290 µg, at least about 310 µg, at least about 330 µg, at least about 350 µg, at least about 370 µg, or at least about 390 µg alpha-2 adrenergic agonist. The composition may comprise less than about 400 µg, less than about 390 µg, less than about 370 µg, less than about 350 µg, less than about 330 µg, less than about 310 µg, less than about 290 µg, less than about 270 µg, less than about 250 µg, less than about 230 µg, less than about 210 µg, less than about 190 µg, less than about 170 µg, less than about 150 µg, less than about 130 µg, or less than about 110 µg alpha-2 adrenergic agonist.

In some embodiments, the composition may comprise about 100 to about 400 µg guanfacine. The composition may comprise at least about 100 µg, at least about 120 µg, at least about 140 µg, at least about 160 µg, at least about 180 µg, at least about 200 µg, at least about 220 µg, at least about 240 µg, at least about 260 µg, at least about 280 µg, at least about 300 µg, at least about 320 µg, at least about 340 µg, at least about 360 µg, or at least about 380 µg guanfacine. The composition may comprise less than about 400 µg, less than about 380 µg, less than about 360 µg, less than about 340 µg, less than about 320 µg, less than about 300 µg, less than about 280 µg, less than about 260 µg, less than about 240 µg, less than about 220 µg, less than about 200 µg, less than about 180 µg, less than about 160 µg, less than about 140 µg, or less than about 120 µg guanfacine. In some embodiments, the pharmaceutical compositions may comprise about 250 µg guanfacine.

The pharmaceutical composition may comprise about 30 mg to about 120 mg lidocaine. The composition may comprise at least about 30 mg, at least about 40 mg, at least about 50 mg, at least about 60 mg, at least about 70 mg, at least about 80 mg, at least about 90 mg, at least about 100 mg, or at least about 110 mg lidocaine. The composition may comprise less than about 120 mg, less than about 110 mg, less than about 100 mg, less than about 90 mg, less than about 80 mg, less than about 70 mg, less than about 60 mg, less than about 50 mg, or less than about 40 mg lidocaine. In some embodiments, the pharmaceutical compositions may comprise about 60 mg lidocaine.

The pharmaceutical composition may further comprise a solvent such as water.

6. DOSES AND ADMINISTRATION

The compositions disclosed herein can be administered therapeutically. In therapeutic applications, the composition is administered to a subject in need thereof in an amount sufficient to elicit a therapeutic effect. An amount adequate to accomplish this is defined as "therapeutically effective dose." Amounts effective for this use will depend on, e.g., the particular composition of the conjugate regimen administered, the manner of administration, the stage and severity of the disease, the general state of health of the patient, and the judgment of the prescribing physician. For purposes of all of the inventive methods, the dose should be sufficient to affect a therapeutic response in the subject over a reasonable time frame.

The compositions disclosed herein can be administered by methods well known in the art as described in Donnelly et al. (*Ann. Rev. Immunol.* 1997, 15, 617-648); Felgner et al. (U.S. Pat. No. 5,580,859, issued Dec. 3, 1996); Felgner (U.S. Pat. No. 5,703,055, issued Dec. 30, 1997); and Carson et al. (U.S. Pat. No. 5,679,647, issued Oct. 21, 1997). One skilled in the art would know that the choice of a pharmaceutically acceptable carrier, including a physiologically acceptable compound, depends, for example, on the route of administration.

The compositions disclosed herein may conveniently be presented in a single dose or as divided doses administered at appropriate intervals, for example, as two, three, four or more sub-doses per day. The sub-dose itself may be further divided, e.g., into a number of discrete loosely spaced administrations.

The determination of effective dosage levels, that is the dosage levels necessary to achieve the desired result, can be accomplished by one skilled in the art using routine methods, for example, human clinical trials, in vivo studies and in vitro studies.

It should be noted that the attending physician would know how to and when to terminate, interrupt, or adjust administration due to toxicity or organ dysfunctions. Conversely, the attending physician would also know to adjust treatment to higher levels if the clinical response were not adequate (precluding toxicity). The magnitude of an administrated dose in the management of the disorder of interest will vary with the severity of the symptoms to be treated and the route of administration. Further, the dose, and perhaps dose frequency, will also vary according to the age, body weight, and response of the individual patient. A program comparable to that discussed above may be used in veterinary medicine.

A therapeutically effective amount of the compositions may be administered alone or in combination with a therapeutically effective amount of at least one additional therapeutic agents. In some embodiments, effective combination therapy is achieved with a single composition or pharmacological formulation that includes both agents, or with two distinct compositions or formulations, administered at the same time, wherein one composition includes a compound of this invention, and the other includes the second agent(s). Alternatively, in other embodiments, the therapy precedes or follows the other agent treatment by intervals ranging from minutes to months.

The dose of the compositions also will be determined by the existence, nature and extent of any adverse side effects that might accompany the administration of a particular agent. Typically, the attending physician will decide the dosage with which to treat each individual patient, taking into consideration a variety of factors, such as age, body weight, general health, diet, sex, therapeutic agent to be administered, route of administration, and the severity of the condition being treated.

The compositions disclosed can be administered using standard administration techniques, including oral, intravenous, intraperitoneal, subcutaneous, pulmonary, transdermal, intramuscular, intranasal, buccal, sublingual, rectal, vaginal, or suppository administration. The compositions disclosed may be administered by injection. In some embodiments, the administration is perineural administration, or administration directly to, proximal to or within the tissues surrounding at least one nerve of a subject. The perineural administration may be a nerve block.

7. EXAMPLES

Example 1

Association Between Alpha-2B Adrenergic Receptor and Trigeminal Neuropathy

Phenome-wide association studies (PheWAS) is a systematic and efficient approach to discover novel disease-variant associations and pleiotropy using BioVU, a centralized resource for investigating genotype-phenotype associations. It is the comprehensive and diverse nature of the diagnostic information within EMRs that enables PheWAS. PheWAS not only replicates known genetic-phenotypic associations but also reveals new phenotypic associations with genetic variants, enhancing analyses of the genomic basis of human diseases and providing genetic support for drug discovery and drug repurposing efforts.

Through PheWAS analysis, associations with single nucleotide polymorphisms (SNPs) in ADRA2B were identified (Table 1), which have functional effects opposite of alpha-2 adrenergic agonists. Sorting Intolerant from Tolerant (SIFT) scores at or below 0.05 are considered to be deleterious; those above 0.05 are considered to be tolerated. Polyphen2 (PP2) scores below 0.447 are considered benign; those higher than 0.908 are considered probably damaging; and those in between possibly damaging.

The Val376Ile variant (rs29000569) sits within one of the transmembrane domains of the protein and was predicted to be damaging. The other variant, Gly211Ala (rs9333568), is in the large cytoplasmic loop of the protein and was predicted to be tolerated but may have functional effects not yet known.

TABLE 2

SNPs in ADRA2B

| SNP | rsID | Mutation | SIFT | PP2 | Exome VAF* | Variant allele frequency ♪ | Populations with highest variant allele frequency ♪ |
|---|---|---|---|---|---|---|---|
| Val376Ile | rs29000569 | Missense | 0.02 | 0.891 | 0.0027 | 0.0003 | Ashkenazi Jewish (0.0054) |
| Gly211Ala | rs9333568 | Missense | 0.61 | 0.008 | 0.05 | 0.05 | European ancestry (0.00002) |

*Variant allele frequency (VAF) reflects the VAF in the BioVU Exomechip European ancestry population.

♪ Variant allele frequencies for populations from the ExAC/gnomAD populations Feb. 2017.41

Data from PheWAS showed that the V376I variant in the gene ADAR2B strongly associated with a cluster of phenotypes were related to neuralgia/nerve-related pain disorders. More specifically, the conditions identified in the PheWAS study included pain involving the trigeminal nerve, a chronic and debilitating pain with few effective interventions for management (Table 2). CN5 is a nerve that breaks into three smaller nerves, and those three nerves then subsequently branch into different areas of the head and face.

TABLE 2

Novel Association of neuropathic pain

| Condition | PheWAS Code | rsID | SNP | p Value | Odds Ratio | Case Carriers | Total Cases |
|---|---|---|---|---|---|---|---|
| Trigeminal nerve disorders [CN5] | 352.1 | rs29000569 | Val376Ile | 0.003075 | 4.62 | 4 | 170 |
| Temporomandibular joint disorder, unspecified | 526.41 | rs9333568 | Gly211Ala | 0.00555 | 2.2 | 13 | 67 |
| Herpes zoster with nervous system complications | 053.1 | rs29000569 | Val376Ile | 0.0007443 | 7.7 | 3 | 82 |

Example 2

Treatment of Trigeminal Neuropathy with Guanfacine and Lidocaine

The efficacy of guanfacine alone, or as an effective adjunct to lidocaine in trigeminal nerve block for the treatment of painful trigeminal neuropathy will be compared to lidocaine alone.

Pain management assessment will include measuring the efficacy of guanfacine in reducing acute pain and extending the duration of pain relief when delivered in combination with lidocaine by injection to the trigeminal nerve. Pain will be measured on a visual analog scale (VAS), on a scale from 0-10, with 10 being the worst pain and 0 being no pain. Endpoints will be measured to evaluate the exploratory objectives of the study assessing guanfacine and lidocaine in combination compared to lidocaine alone, in pain management in the painful trigeminal neuropathy patient. The primary endpoint will designate the time to return to baseline pain (VAS) measurement after treatment with guanfacine as adjuvant to 1% lidocaine compared to 1% lidocaine alone. The safety endpoint will measure the side effect profiles of the combination of guanfacine and lidocaine as compared to lidocaine alone on relevant adverse event measures such as sedation, local site reaction, and confusion. The other data measured will include: tracking of pain (VAS) following treatment with either the guanfacine and lidocaine or lidocaine alone, quality of life after treatment to be measured using PROMIS Global Health-10 SF during periods following treatment, frequency of acute trigeminal nerve pain attacks during the follow-up periods, total amount of rescue medications (opioid and non-opioid analgesics) for pain management during the periods following treatment, and time to first rescue medication during the periods following treatment.

Materials and Methods:

Study drug: Lidocaine 1% PF vials will be purchased from Pfizer. API grade guanfacine will be purchased from Quimica Sintetica S. A. Vanderbilt University Medical Center's Investigational Drug Service will compound and dispense a 10 ml sterile syringe with a sterile locking syringe cap containing 6 ml 1% lidocaine with 250 mcg guanfacine. As is well known in the art, guanfacine may be in the HCl salt form. While the focus of this example is on a combination treatment of guanfacine and lidocaine, guanfacine may be administered as discussed herein alone without lidocaine.

Active control: The active control drug (6 ml 1% lidocaine sterile injection) will be dispensed by VUMC's Investigational Drug Service and will be identical in appearance to the study drug.

Trigeminal nerve block procedure: Trigeminal nerve block will occur with the patient supine. Based upon landmark and fluoroscopic image, the needle insertion site will be located and infiltrated with 1 ml of 1% lidocaine. A 22-gauge stimuplex needle will be advanced under fluoroscopic guidance to the pterygoid fossa. Active stimulation at 0.75 mV will be used to confirm needle tip approaching the V2 maxillary branch of the trigeminal nerve and reduced to 0.3 mV upon patient sensation. After confirming that the needle tip is in position with no sensation felt by the patient at <0.3 mV, and after negative aspiration for blood or cerebral spinal fluid (CSF), 0.25 ml of iodinated contrast (Omnipaque 300) or gadolinium-based contrast agent (Omniscan) if allergic to iodinated contrast will be injected under digital subtraction fluoroscopy to ensure no vascular uptake. If vascular uptake occurs, the needle tip will be adjusted, and tested again for vascular uptake. After confirmation of the needle placement, 3 ml of the study drug or active control will be delivered. The needle will be retracted and angled toward the V3 mandibular branch of the trigeminal nerve and confirmed in the same method with fluoroscopy and stimulation as above. After confirmation of needle placement, the remaining 3 ml of the study drug or active control will be deposited. The needle will then be removed. The patient will be taken to the recovery room and monitored for 60 minutes.

The study is a single center, randomized, double-blind, 2×2 crossover pilot study with two arms; study drug (guanfacine and lidocaine combination) and active control (lidocaine alone). Adult participants between 18 and 80 years of age who have been diagnosed with painful trigeminal neuropathy will be consented for the study. The study will include three visits; an initial visit for evaluation, consent and baseline surveys followed by two procedural visits. After each procedural visit data will be collected for 14 days. Participants will be randomized in permuted pairs (to ensure balance after every second enrollment) to receive either study drug (guanfacine and lidocaine combination) or active control (lidocaine alone) for the first nerve block procedure.

One group of patients will receive a trigeminal nerve block with an injection of lidocaine on Day 1 and a subsequent injection of the combination of lidocaine and guanfacine between Day 15 and 28. Alternatively, another group of patients will receive a trigeminal nerve block with an injection of the combination of lidocaine and guanfacine on Day 1 and a subsequent injection lidocaine alone between Day 15 and 28. The lidocaine only injections will be 6 mL of 1% lidocaine. The guanfacine in combination with lidocaine will include the same dose of lidocaine with the addition of 250 μg guanfacine.

Patients with facial pain will be evaluated in clinic; those deemed to have a diagnosis of painful trigeminal neuropathy will be considered for enrollment. Baseline data that will be collected includes demographics (name, age, sex), physical examination; heat rate and rhythm, blood pressure; comorbid health conditions and prior surgeries or treatments; current and past medications within 6 months. The targeted pain history will include pain duration, frequency of exacerbations, location, radiation, severity (VAS), quality, instigating event, exacerbations, alleviations, pain treatment frequency and duration of use (non-medical and medical treatments) and changes in pain over time. The targeted pain physical exam will include assessment of light touch test for allodynia and pinprick test for hyperalgesia of the trigeminal dermatome V1-3 regions of the face. Standard practice prior to trigeminal nerve block is to review recent MRI or CT imaging to ensure safety of needle approach to target location. If no recent imaging exists, this will be ordered as part of standard care prior to nerve block. Urine pregnancy test and urine drug screen for illicit use of controlled substances will be obtained. Participants will be educated on birth control measures and agree to 2 methods of birth control that they will plan to use during the study period (abstinence is an appropriate method).

VAS pain scores will be collected every 30 minutes for 8 hours leading up to the first procedure to establish a baseline area under the curve (AUC) measurement of pain. Current and average 24-hour pain (VAS) before procedure will also be recorded.

On the day of the first procedure, participants will be asked to record their pain intensity, 24-hour VAS and current VAS, before the procedure to establish a baseline pain score.

Other data will be collected for secondary measures: frequency of pain attacks, basal and breakthrough opioid and non-opioid analgesic frequency and dose. Overall quality of life will also be assessed.

A participant will receive either study drug (guanfacine and lidocaine combination) or active control (lidocaine alone) for the first trigeminal nerve block based on randomization. Participants will be monitored for pain intensity at 30-minute time intervals for the first 8 hours after block in addition to safety monitoring procedures. Participant responses will be collected at 30 minute intervals for the first 8 hours while in the recovery (first 60 minutes) and after discharge home.

During the follow-up period after the first trigeminal nerve block procedure, participants will be monitored once daily at the same timepoint for 14 days. Participants will also be monitored for any use of rescue medication (analgesics) once daily, once weekly for overall quality of life and frequency of pain attacks, and instructed to record adverse events and to immediately contact the nurse regarding adverse events.

At the end of the first follow-up period, participants will be eligible to receive the second trigeminal nerve block procedure using the alternative drug not received during the first nerve block. Participants will record 24-hour VAS and current VAS, and the other baseline measurement as completed before the first procedure.

If VAS<5 on the pain scale, participants will not be eligible for second trigeminal nerve block during the visit. The pain intensity will be monitored daily to see if the participant pain is above 5 on the pain scale and eligible for the second nerve block procedure. In general, the participants would likely receive both treatments unless they experience intolerable toxicity. If a participant is unable or ineligible to receive second trigeminal nerve block, then the participant's data collected during the first nerve block will be included in the analysis. In addition, a replacement participant may be enrolled to ensure proper participant number for analysis.

The procedure for the second trigeminal nerve block is the same as the first and will be followed by the same measurements for the day of treatment and the fourteen days following.

Data Analysis:

The effects of guanfacine adjuvant (intervention) versus active control on the time to return to baseline pain (primary) will be assessed using linear mixed-effects regression, adjusting for randomization order group and its interaction with the intervention/control indicator. A random intercept indexed by study participant will be used to account for within-participant correlation of the pre- and post-crossover measurements. The linear model assumptions will be assessed by examining residuals, conditional on the empirical Bayes estimates of random effects. If there is evidence that the linear model assumptions are violated (e.g., non-normal residuals or the very unlikely possibility of right censoring), alternative model formulations will be considered as necessary. The overall effect of intervention on the primary outcome will be tested using a two degree-of-freedom chunk test against the null hypothesis of no intervention main effect and no order-by-intervention interaction. The effects of intervention on the mean time to return to baseline will be summarized using estimates and 95% confidence intervals, stratified by order group. The effects of guanfacine adjuvant versus active control on secondary outcomes will be assessed using similar mixed-effects regression techniques as appropriate for the type of outcome (including proportional hazards, cumulative logit, logistic, and linear regression methods), adjusting for randomization order group and its interaction with the intervention/control indicator. A random intercept indexed by study participant will be used to account for within-participant correlation. Quantitative and/or graphical regression diagnostics will be examined, and alternative model formulations will be considered as appropriate. Intervention effects will be tested and summarized as described above. No familywise hypotheses will be tested; no adjustments will be made to control any familywise type-I error probability.

Statistical power and sample size: Evidence from the medical literature and expert opinion suggests that the mean duration of pain relief after treatment with lidocaine alone (active control group) is approximately 140 minutes. The sample size for the proposed study was selected to achieve at least 80% power to detect a 20% or greater increase in the duration of pain relief after treatment with lidocaine plus guanfacine as an adjuvant (treatment group). This corresponds to a mean difference of 28 minutes, as a proof of principal of the mechanism of action of guanfacine with lidocaine. If successful, a modified formulation of guanfacine may be pursued to optimize delivery and pain relief duration.

A simulation-based power analysis was implemented using linear mixed-effects regression. Both between- and within-subjects variability were conservatively assumed to have standard deviation 30 minutes. Under these conditions, 30 participants will ensure approximately 90% power to detect a significant mean difference (28 minutes or greater in pain relief duration). Although 28-70 incremental/additional minutes of pain relief would be clinically significant by itself, the finding would validate the pain relief mechanism of guanfacine in the trigeminal nerve and show that enhanced pain relief can be achieved by the combination of drugs, and therefore extends the utility of the mechanism into further clinical development.

It is understood that the foregoing detailed description and accompanying examples are merely illustrative and are not to be taken as limitation upon the scope of the invention, which is defined solely by the following claims.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

For reasons of completeness, various aspects of the invention are set out in the following numbered clauses:

Clause 1. A method for treating trigeminal nerve pain in a subject in need thereof, the method comprising administering to the subject by perineural injection of the trigeminal nerve a therapeutically effective amount of a composition comprising an alpha-2 adrenergic agonist, or a pharmaceutically acceptable salt thereof.

Clause 2. The method of clause 1, wherein the trigeminal nerve pain is trigeminal neuralgia.

Clause 3. The method of clause 1, wherein the trigeminal nerve pain is trigeminal neuropathy.

Clause 4. The method of any of clauses 1-3, wherein the alpha-2 adrenergic agonist comprises at least one of the group consisting of clonidine, p-aminoclionidine, tiamenidine, 5-bromo-6-(2 imidazolidine-2-ylamino) quinoxaline, dexmedetomidine, detomidine, medetomidine, oxymetazonline, brimonidine, tizanidine, mivazerol (UCB-Pharma, Belgium), lofexidine, xylazine, guanabenz, guanfacine, guanclofine, guanoxabenz, alpha-methyinorepherine, azepexole, indoramin, 6-allyl-2-amino-5,6,7,8-tetrahydro4H-thiazolo[4,5-d]azepine diHCl, and a combination thereof.

Clause 5. The method of any of clauses 1-4, wherein the alpha-2 adrenergic agonist comprises guanfacine.

Clause 6. The method of clause 5, wherein the composition comprises about 100 µg to about 400 µg guanfacine.

Clause 7. The method of clause 5 or clause 6, wherein the composition comprises about 250 µg guanfacine.

Clause 8. The method of any of clauses 1-7, wherein the composition further comprises an anesthetic.

Clause 9. The method of any of clauses 1-8, wherein the composition further comprises lidocaine.

Clause 10. The method of clause 9, wherein the composition comprises about 30 to about 120 mg lidocaine.

Clause 11. The method of clause 9 or clause 10, wherein the composition comprises about 60 mg lidocaine.

Clause 12. The method of any of the preceding clauses, further comprising administering a second composition comprising an anesthetic to the subject.

Clause 13. The method of clause 12, wherein the second composition comprises about 60 mg lidocaine.

Clause 14. The method of clause 12 or clause 13, wherein the second composition is administered by perineural injection of the trigeminal nerve.

Clause 15. The method of any of clauses 12-14, wherein the second composition is administered to the subject before the composition comprising guanfacine is administered to the subject.

Clause 16. The method of any of clauses 12-15, wherein the administration of the composition comprising guanfacine and the administration of the second composition are sequential and separated by a period of time.

Clause 17. A method for treating trigeminal nerve pain in a subject in need thereof, the method comprising:
a. injecting at the trigeminal nerve of the subject a composition comprising lidocaine, or a pharmaceutically acceptable salt thereof; and
b. injecting at the trigeminal nerve of the subject a therapeutically effective amount of a composition comprising guanfacine and lidocaine, or pharmaceutically acceptable salts thereof.

Clause 18. The method of clause 17, wherein the trigeminal nerve pain is trigeminal neuralgia or trigeminal neuropathy.

Clause 19. The method of clause 17 or 18, wherein the composition comprising guanfacine and lidocaine comprises about 250 µg guanfacine and about 60 mg lidocaine.

Clause 20. An injectable pharmaceutical composition comprising about 100 µg to about 400 µg guanfacine and about 30 mg to about 120 mg lidocaine.

Clause 21. The composition of clause 20 comprising about 250 µg guanfacine.

Clause 22. The composition of clause 20 or 21 comprising about 60 mg lidocaine.

Clause 23. The composition of any one of clauses 20-22 further comprising a pharmaceutically acceptable carrier.

Clause 24. The composition of clause 23, wherein the pharmaceutically acceptable carrier is water.

Clause 25. The method of any one of clauses 17-24, wherein the composition is administered to the subject by perineural injection of the trigeminal nerve.

Clause 26. The method of clause 1 or clause 17, wherein the subject has a single nucleotide polymorphism in ADRA2B gene.

Clause 27. The method of clause 26, wherein the single nucleotide polymorphism in the ADRA2B gene is a missense mutation wherein Val (376) is mutated to Ile (376).

Clause 28. The method of clause 1 or clause 17, wherein pain is measured by a visual analog scale (VAS) score.

Clause 29. The method of clause 28, wherein the VAS score is less than 5 following administration of the composition.

Clause 30. The method of any one of clauses 1-3, 8-14, 17-19, 23-25 or 29, wherein the alpha-2 adrenergic agonist comprises a compound of the formula, or a pharmaceutically acceptable salt thereof,

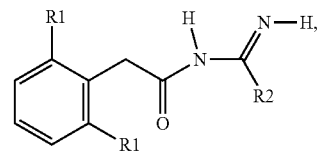

wherein R1 is chloro or methyl and R2 is lower alkoxy, lower alkylthio, amine, or p-nitrobenzylthio.

I claim:

1. A method for treating trigeminal nerve pain in a subject in need thereof, the method comprising administering to the subject by perineural injection of the trigeminal nerve a therapeutically effective amount of a composition comprising an alpha-2 adrenergic agonist or a pharmaceutically acceptable salt thereof and an anesthetic or a pharmaceutically acceptable salt thereof;
wherein the alpha-2 adrenergic agonist and the anesthetic are dissolved in solution.

2. The method of claim 1, wherein the trigeminal nerve pain is trigeminal neuralgia.

3. The method of claim 1, wherein the trigeminal nerve pain is trigeminal neuropathy.

4. The method of claim 1, wherein the alpha-2 adrenergic agonist comprises at least one of the group consisting of clonidine, p-aminoclionidine, tiamenidine, 5-bromo-6-(2 imidazolidine-2-ylamino) quinoxaline, dexmedetomidine, detomidine, medetomidine, oxymetazonline, brimonidine, tizanidine, mivazerol (UCB-Pharma, Belgium), lofexidine, xylazine, guanabenz, guanfacine, guanclofine, guanoxabenz, alpha-methyinorepherine, azepexole, indoramin, 6-allyl-2-amino-5,6,7,8-tetrahydro4H-thiazolo [4,5-d] azepine diHCl, and a combination thereof.

5. The method of claim 1, wherein the alpha-2 adrenergic agonist comprises guanfacine.

6. The method of claim 4, wherein the composition comprises about 100 µg to about 400 µg guanfacine.

7. The method of claim 4, wherein the composition comprises about 250 µg guanfacine.

8. The method of claim 1, wherein the anesthetic is lidocaine.

9. The method of claim 8, wherein the composition comprises about 30 to about 120 mg lidocaine.

10. The method of claim 8, wherein the composition comprises about 60 mg lidocaine.

11. A method for treating trigeminal nerve pain in a subject in need thereof, the method comprising:
injecting at the trigeminal nerve of the subject a therapeutically effective amount of a composition comprising guanfacine and lidocaine, or pharmaceutically acceptable salts thereof, wherein the guanfacine and the lidocaine are dissolved in solution.

12. The method of claim 11, wherein the trigeminal nerve pain is trigeminal neuralgia or trigeminal neuropathy.

13. The method of claim 11, wherein the composition comprising guanfacine and lidocaine comprises about 250 µg guanfacine and about 60 mg lidocaine.

14. An injectable pharmaceutical composition comprising about 100 µg to about 400 µg guanfacine and about 30 mg to about 120 mg lidocaine, wherein the guanfacine and the lidocaine are dissolved in solution.

15. The method of claim 11, wherein the composition is administered to the subject by perineural injection of the trigeminal nerve.

16. The method of claim 1, wherein the subject has a single nucleotide polymorphism in ADRA2B gene.

17. The method of claim 16, wherein the single nucleotide polymorphism in the ADRA2B gene is a missense mutation wherein Val (376) is mutated to Ile (376).

18. The method of claim 1, wherein the alpha-2 adrenergic agonist comprises a compound of the formula, or a pharmaceutically acceptable salt thereof:

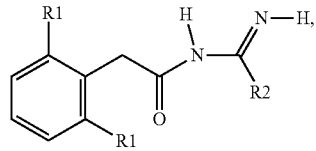

wherein R1 is chloro or methyl and R2 is lower alkoxy, lower alkylthio, amine, or p-nitrobenzylthio.

* * * * *